(12) United States Patent
Baligh et al.

(10) Patent No.: US 10,998,945 B1
(45) Date of Patent: May 4, 2021

(54) BEAM ACQUISITION METHODS AND COMMUNICATION DEVICES

(71) Applicants: Mohammadhadi Baligh, Ottawa (CA); Ahmad Abu Al Haija, Ottawa (CA)

(72) Inventors: Mohammadhadi Baligh, Ottawa (CA); Ahmad Abu Al Haija, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/739,760

(22) Filed: Jan. 10, 2020

(51) Int. Cl.
| | | |
|---|---|---|
| H04L 1/14 | (2006.01) | |
| H04B 7/0417 | (2017.01) | |
| H04B 7/08 | (2006.01) | |
| H04B 7/06 | (2006.01) | |

(52) U.S. Cl.
CPC ......... H04B 7/0417 (2013.01); H04B 7/0617 (2013.01); H04B 7/086 (2013.01)

(58) Field of Classification Search
CPC ..... H04B 7/0417; H04B 7/0617; H04B 7/086
USPC .................. 375/367, 299, 347; 455/101, 132
See application file for complete search history.

(56) References Cited

U.S. PATENT DOCUMENTS

| | | | | |
|---|---|---|---|---|
| 2013/0059619 A1* | 3/2013 | Kim | ...................... | H04L 5/0051 455/509 |
| 2013/0315083 A1* | 11/2013 | Jung | ........................ | H04B 7/26 370/252 |
| 2015/0326297 A1 | 11/2015 | Petersson et al. | | |
| 2016/0065284 A1* | 3/2016 | Yu | ........................ | H04B 7/088 370/329 |
| 2017/0074962 A1* | 3/2017 | Badawy | .................. | G01S 3/065 |
| 2018/0006702 A1 | 1/2018 | Doostnejad et al. | | |
| 2018/0049116 A1* | 2/2018 | Islam | .................. | H04W 72/085 |
| 2019/0319688 A1* | 10/2019 | Sun | .......................... | H04B 7/10 |
| 2020/0059290 A1* | 2/2020 | Pan | ........................ | H04B 7/088 |
| 2020/0128455 A1* | 4/2020 | Da Silva | ........... | H04W 36/0072 |
| 2020/0145855 A1* | 5/2020 | Hahn | ...................... | H04W 4/40 |

(Continued)

FOREIGN PATENT DOCUMENTS

| | | |
|---|---|---|
| CN | 108736944 A | 11/2018 |
| WO | 2017014683 A1 | 1/2017 |

OTHER PUBLICATIONS

Mathew Samimi et al. "28 GHz Angle of Arrival and Angle of Departure Analysis for Outdoor Cellular Communications using Steerable Beam Antennas in New York City", IEEE 77th Vehicular Technology Conference, 2013, 6 pages.*

(Continued)

*Primary Examiner* — Tesfaldet Bocure

(57) ABSTRACT

At a first communication device in a wireless communication network, reference signaling is received from a second communication device in two or more beams with a same direction, and one or more values associated with a direction at which the first communication device received the reference signaling from the second communication device are determined. The one or more values are determined based on the received reference signaling. The direction has a higher accuracy than a beam width associated with the received reference signaling. The direction may be or include an angle of arrival or an angle of departure, for example, and in the case of an angle of departure signaling indicative of the one or more values is transmitted by the first communication device, to the second communication device or another component such as network equipment.

20 Claims, 20 Drawing Sheets

(56) References Cited

U.S. PATENT DOCUMENTS

2020/0186228 A1* 6/2020 Raghavan .............. H04W 16/28
2021/0084578 A1* 3/2021 Ingale .................. H04W 48/16

OTHER PUBLICATIONS

Song et al. "A Robust Time-Domain Beam Alignment Scheme for Multi-User Wideband mmWave Systems", WSA 2018; 22nd International ITG Workshop on Smart Antennas, 2018, pp. 1-7.*

Jessy Cavazos, "How 5G Works: Understanding the Difference Between Beamsteering and Beamforming", Keysight Blogs, posted on the internet on Mar. 31, 2021 and retrieved on Mar. 18, 2021, 6 pages.*

A. Faisal et al., "Ultra-Massive MIMO system at terahertz bands: prospective and challenges," available on https://arxiv.org/abs/1902.11090 , Apr. 2019, 7 pages.

C. Lin et al., "Subarray-based coordinated beamforming training for mmWave and sub-THz communications", IEEE JSAC, vol. 35, No. 9, Sep. 2017, 12 pages.

J. Lee et. al., "Channel Estimation via Orthogonal Matching Pursuit for Hybrid MIMO Systems in Millimeter Wave Communications," IEEE TCOM vol. 64, No. 6, Jun. 2016, 17 pages.

D. Zhu et al., "High-resolution angle tracking for mobile wideband mmWave systems with antenna array calibration", IEEE Trans wireless commun. vol. 17, No. 11, Nov. 2018, 17 pages.

Y.-X. Zhang et al., "A novel monopulse angle estimation method for wideband LFM radars," Sensors, vol. 16, No. 6, p. 817, Jun. 3, 2016, 13 pages.

M. Cai, et al., "Effect of Wideband Beam Squint on Codebook Design in Phased-Array Wireless Systems," IEEE Globecom 2016, 6 pages.

M. Jian et al., "Angle-Domain Aided UL/DL Channel Estimation for Wideband mmWave Massive MIMO Systems With Beam Squint," IEEE TWCOM, vol. 18, No. 7, Jul. 2019, 13 pages.

Y. Asano et. al., "Proposal of millimeter-wave holographic radar with antenna switching," IEEE MTT-S International Microwave Symposium Digest 2001, 4 pages.

* cited by examiner

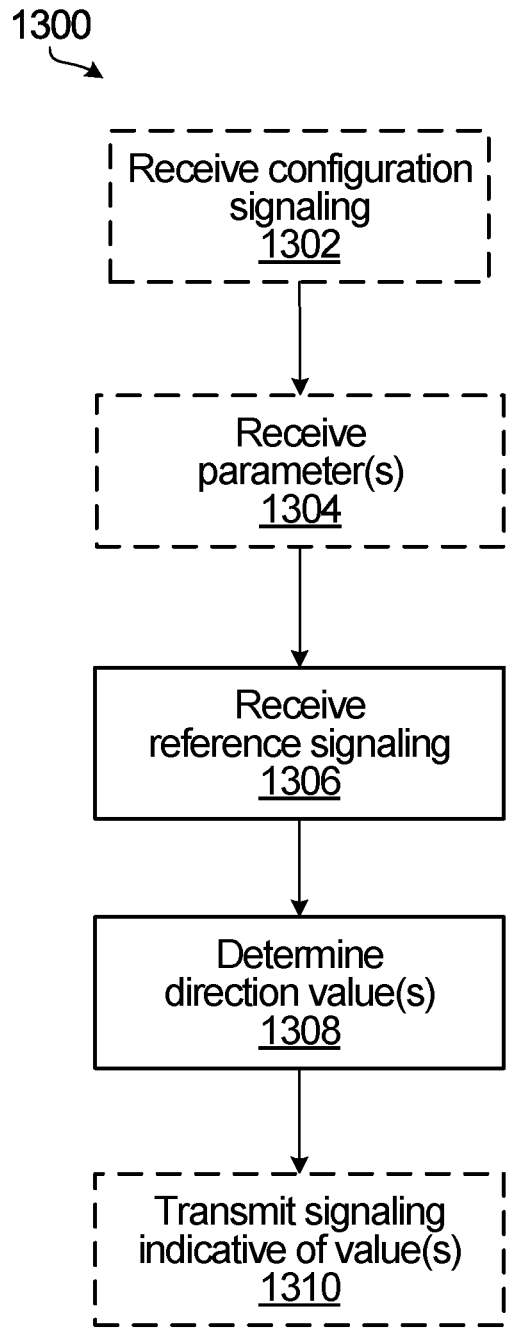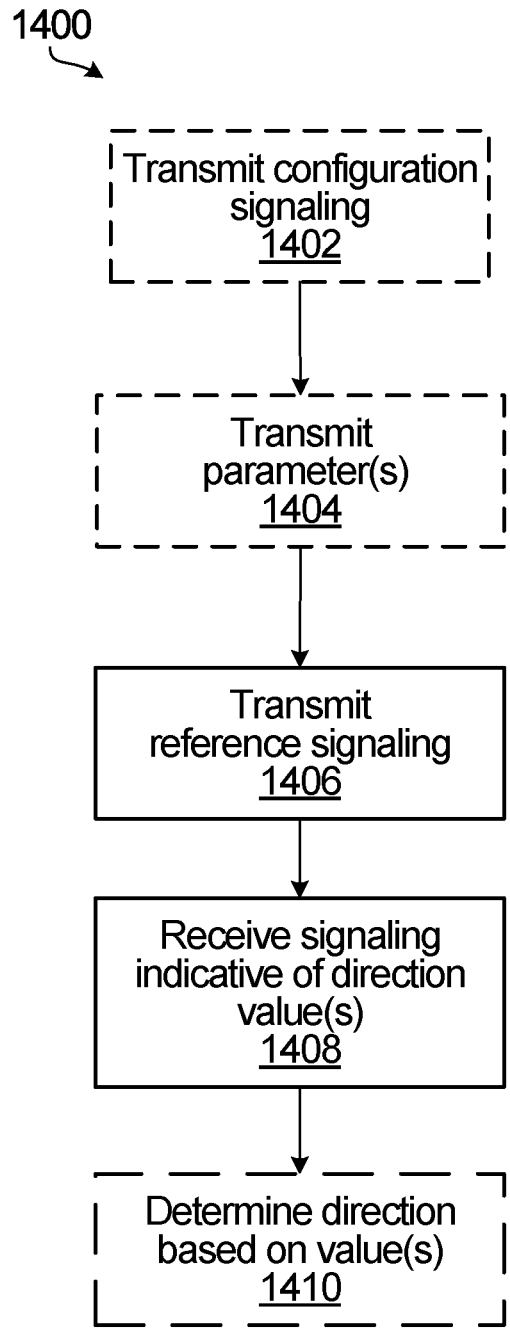
FIG. 13   FIG. 14

BEAM ACQUISITION METHODS AND COMMUNICATION DEVICES

FIELD

The present disclosure relates generally to wireless communications and, in particular, to beam acquisition in wireless communication networks.

BACKGROUND

Wireless communication over frequency bands in the millimeter wave (mmWave)/sub-Terahertz (THz) bands (100-300 Gigahertz (GHz)) has been identified as a potential vehicle to further enhance the connectivity offered by fifth generation (5G) communication systems. Compared to lower bands (<100 GHz), the THz transmission channel has larger bandwidth (BW), higher scattering and reflection losses (more sparse channel), and higher path loss. One potential solution to address high path loss pertains to ultra-massive Multiple-Input Multiple-Output (UM-MIMO) systems with simple implementation through an array-of-subarrays (AoSA) structure. In this type of structure, antenna panels in multiple subarrays include many antenna elements connected to one or several Radio Frequency (RF) chains which, by using a hybrid of analog and digital beamforming at both the transmitter and receiver, can provide high beamforming gain with narrow beams. For such narrow beams, beam acquisition can be a challenge because it requires accurate estimation of the channel Angle of Arrival (AoA) and Angle of Departure (AoD).

SUMMARY

The present disclosure relates in part to fast yet efficient estimation algorithms for AoA/AoD considering THz channel characteristics, in particular sparsity, large BW, and high path loss. Impacts on signaling in uplink (UL) and downlink (DL) transmission are also considered.

According to an aspect of the present disclosure, a method involves receiving, at a first communication device in a wireless communication network, reference signaling in two or more beams with a same direction from a second communication device in the wireless communication network, and determining a value associated with a direction at which the first communication device received the reference signaling from the second communication device. The value is determined based on the received reference signaling. The direction has a higher accuracy than a beam width associated with the received reference signaling.

Another aspect of the present disclosure relates to a non-transitory processor-readable medium storing instructions which, when executed by one or more processors at a first communication device in a wireless communication network, cause the one or more processors to perform such a method. In an embodiment, the method involves receiving, at the first communication device, reference signaling in two or more beams with a same direction from a second communication device in the wireless communication network; and determining, based on the received reference signaling, a value associated with a direction at which the first communication device received the reference signaling from the second communication device, the direction having a higher accuracy than a beam width associated with the received reference signaling.

A first communication device according to a further aspect of the present disclosure includes a receiver to receive reference signaling in two or more beams with a same direction from a second communication device in the wireless communication network, and a processor, coupled to the receiver, to determine based on the received reference signaling, a value associated with a direction at which the first communication device received the reference signaling from the second communication device. The direction has a higher accuracy than a beam width associated with the received reference signaling.

A method in accordance with yet another aspect of the present disclosure involves transmitting, to a first communication device from a second communication device in a wireless communication network, reference signaling in two or more beams with a same direction; and receiving, at the second communication device, signaling indicative of a value determined at the first communication device and associated with a direction. The direction is a direction of transmission of the reference signaling from which the first communication device received the reference signaling, and has a higher accuracy than a beam width associated with the reference signaling.

Such a method may be implemented in the form of instructions for execution by one or more processors. For example, a non-transitory processor-readable medium may store instructions which, when executed by one or more processors at a second communication device in a wireless communication network, cause the one or more processors to perform a method that involves: transmitting, to a first communication device in the wireless communication network, reference signaling in two or more beams with a same direction; and receiving, at the second communication device, signaling indicative of a value determined at the first communication device and associated with a direction of transmission of the reference signaling from which the first communication device received the reference signaling. The direction has a higher accuracy than a beam width associated with the reference signaling.

The present disclosure also relates in part to a communication device for a wireless communication network, wherein the communication device includes: a transmitter to transmit reference signaling over two or more beams with a same direction to a first communication device in the wireless communication network; and a receiver to receive signaling indicative of a value determined at the first communication device and associated with a direction of transmission of the reference signaling from the communication device from which the first communication device received the reference signaling, the direction having a higher accuracy than a beam width associated with the reference signaling.

Other aspects and features of embodiments of the present disclosure will become apparent to those ordinarily skilled in the art upon review of the following description.

BRIEF DESCRIPTION OF THE DRAWINGS

Embodiments of the disclosure will now be described with reference to the attached drawings in which:

FIG. 13 is a flow diagram illustrating an example method according to an embodiment;

FIG. 14 is a flow diagram illustrating an example method according to an embodiment;

DETAILED DESCRIPTION

Figure 1:
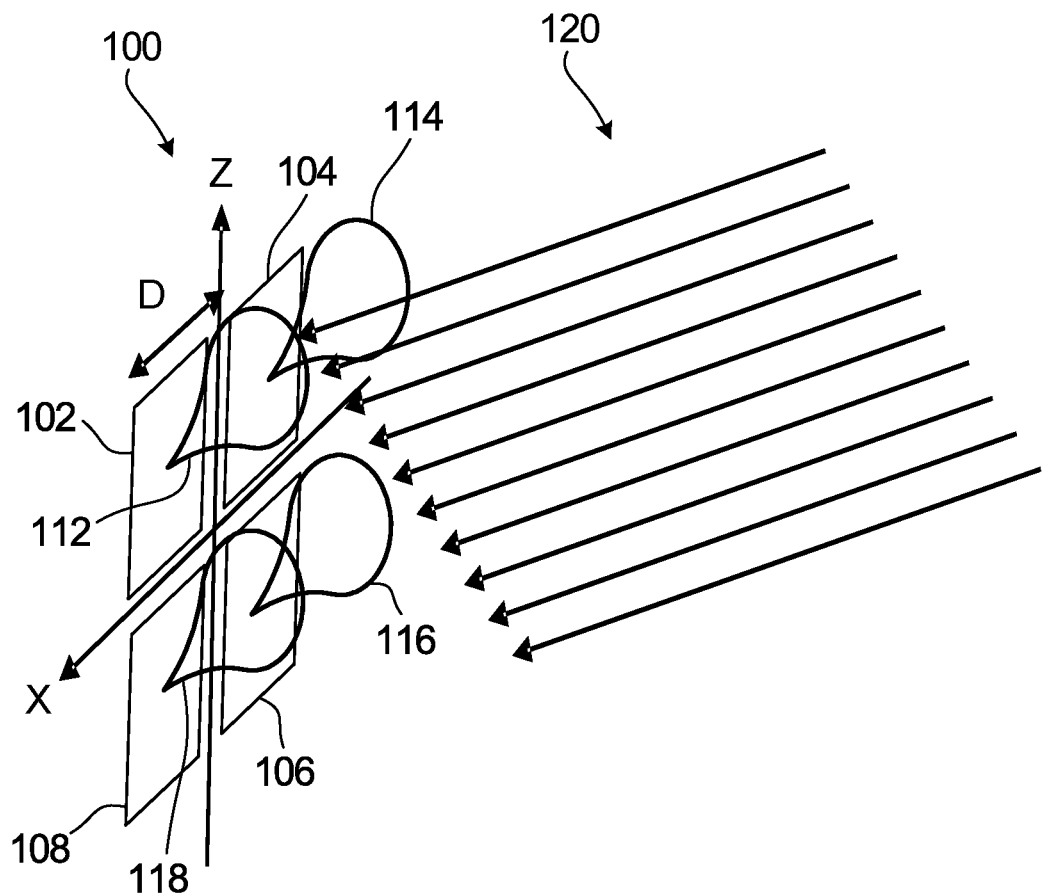
FIG. 1 is a block diagram illustrating an example AoSA antenna system.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Several techniques have been proposed for beam acquisition in MIMO systems, including techniques based on beam sweeping and techniques based on compressive sensing. Although techniques based on compressive sensing may have lower overhead than those based on beam sweeping, they tend to have high computational requirements due to their iterative processing like orthogonal matching pursuit (OMP). Hence, there is a general need for a beam sweeping technique with lower overhead and computation.

Considering narrow beams in THz band as noted above, conventional beam searching or sweeping over all possible narrow beams leads to high overhead. The overhead is proportional to the number of swept beams at a transmitter and receiver. Hierarchical beamforming may be deployed to reduce overheard by performing multiple layers of beam sweeping, with progressive beam refinement, where beam sweeping starts by acquiring coarse transmit (Tx) and receive (Rx) beam pairs and then performing beam sweeping within the coarse (wider) beams to acquire finer (narrower) and more accurate beams in the direction of AoA/AoD.

Despite the fact that hierarchical beamforming may reduce the overhead associated with conventional beam searching, with very narrow beams it is important to further reduce overhead. Some techniques have been proposed to directly estimate the AoA/AoD from wide beams instead of performing another stage of beam sweeping within the wide beams. In particular, Monopulse radar techniques can be utilized to estimate AoA/AoD from two wide beams through amplitude comparison, phase comparison, or cross correlation between received signals in two beams or antennas. In amplitude comparison, the AoA is estimated using the received power at two antennas or two sets of antennas) with beams that are tilted but overlapped. However, in phase comparison, the AoA is estimated using the phase difference of the received signals at two antennas or two sets of antennas with beams oriented to the same direction. In the same oriented beams, the cross correlation technique may convert the AoA estimation to the estimation of the frequency of the cross correlation function of the received signals in these two beams.

Although the amplitude comparison technique has been adapted to MIMO systems, with different transmitters and receivers for AoA and AoD estimation and tracking, phase comparison and cross correlation techniques need further adaptations and developments. It may therefore be of interest to adapt these techniques to wireless communications with MIMO systems in the THz band considering the following characteristics and challenges: 1) determining the AoA and AoD of a signal as it travels from a transmitter to a receiver or as it is reflected by objects between the transmitter and the receiver; 2) high temporal resolution and few distinguishable paths for THz channel model; 3) there can be phase ambiguity when the phase difference among different subarrays is higher than $2\pi$; and 4) an AoSA MIMO structure with spatial-wideband effect even within different antenna elements in the same sub-array.

In MIMO systems, due to the spatial wideband effect, a signal is received by different antennas at different times, which is unlike in narrow band (NB) systems where signals arrive approximately at the same time to all antennas. This effect occurs when the transmission BW is large and comparable with carrier frequency, in which case symbol (pulse) duration is very short and comparable to arrival delay at different antennas. Because of this delay, Inter-Symbol-Interference (ISI) occurs and in multi-carrier transmission, the signals at different subcarriers appear to arrive from different directions. This is referred to as the "beam squint" phenomenon.

Although ISI decreases the beamforming gain, it may be of interest to utilize the spatial wideband effect in estimating AoA and/or AoD, because the delay between antennas and the ISI level depend on the AoA. Although this might appear to be similar to a relation that is utilized in holographic radar to estimate AoA, radar techniques do not consider the practical AoSA structure in which multiple antennas are jointly connected to one receiver, such as an RF chain. Moreover, because radar transmits and receives a "pilot" signal, it has a time reference signal with which to compare received signals. Furthermore, holographic radar, at any specific time, considers the transmission and reception of one antenna instead of antenna arrays. It may therefore be of interest to investigate an efficient way to utilize the spatial wideband effect for AoA estimation with an AoSA structure in the THz band.

In some embodiments, the present disclosure provides beam acquisition techniques that are applicable, for example, in the THz band for fast and efficient estimation beam acquisition considering such factors as any one or more of the following: 1) the sparse channel, 2) high path loss, 3) spatial wideband effect, and 4) hybrid analog-digital beamforming with an AoSA structure. Impacts on signaling are also considered.

Disclosed embodiments include several beam acquisition techniques, as illustrative and non-limiting examples, for calculating or otherwise determining AoA/AoD by utilizing any one or more of: 1) higher temporal resolution for separating different paths of the channel; 2) cross correlation of received signals at different RF chains connected to a different set of antennas (that is, a separate AoSA structure) with the same beam pattern; and 3) the spatial wideband effect based on transmission delay between adjacent antennas being related to the AoD or based on reception delay between adjacent antennas being related to the AoA. Note that while the analyses presented herein by way of example consider separate AoSA structures, they are extendable to overlapped AoSA structures in which the set of antennas connected to each RF chain overlaps fully or partially with another set of antennas connected to a different RF chain. For example, an antenna can be connected to multiple RF chains in some embodiments.

At THz, a channel is more sparse than that at lower frequencies, with only a few paths between a transmitter and a receiver. High path loss tends to limit the paths to short distances, with mainly line of sight paths and relatively few reflections from nearby reflectors. In such a high path loss environment, usage of beamforming using a large number of antennas, with more reliance on analog beamforming and less reliance on digital beamforming, may be preferred. The relatively large BW that is available at THz, on the order of multiple GHz for example, may allow for a very high temporal resolution. The resulting channel is a sparse with distinguishable paths, and also, due to high bandwidth, beam squint may occur, with a signal arriving or departing with different timing to or from receiver or transmitter antenna elements. These properties may make disclosed embodiments especially suited to THz applications, but other applications or deployments are possible.

In some embodiments, beam direction is estimated based on phase difference measurements of reference signaling that is received in two or more beams with a same direction. Very accurate beam direction can be estimated from a wider beam, which may eliminate the need for further hierarchical beam sweeping beyond beam sweeping using a wide beam. Note that there is potentially an ambiguity in phase in this type of estimation due to wrapping of phase by $2\pi$. Impacts on signaling may include signaling, to a receiver, the beam setup that will be used for beam sweeping at a transmitter and the mapping of the beams so that the receiver is able to estimate beam directions, and feeding back the estimated beam directions to the transmitter. Another embodiment involves configuring reference signaling, such as Channel State Information Reference Signal (CSI-RS) signaling, with instructions for the receiver to calculate or otherwise determine inner phase between different pairs of received CSI-RS signaling corresponding to different beams, and to report back the measured phase differences for these different beams.

Embodiments may involve narrowing down estimation of beam direction by observing the level of beam squint. Beam squint can occur within and between antenna elements that are connected to multiple RF chains. By comparing the beam squint in different RF chains, beam direction can be estimated with at least coarse resolution. Signaling impact may include signaling antenna structure and beam setup to the receiver, to narrow down the estimated beam direction range. This can be useful to alleviate the potential ambiguity caused by phase wrap, for example. Another option involves signaling the configuration of reference signaling such as CSI-RS signaling, and instructing the receiver to compare beam squint and to report one or more measurements or comparison results back to the transmitter for beam direction estimation.

Temporal and beam resolution are used in some embodiments to achieve extreme sparsity of one path per beam sweep per time tick.

Each of these embodiments, and others, are considered herein.

Consider embodiments that involve the separation of paths using beam sweeping and temporal resolution. In a THz deployment model the following observations can be made: when large BW is allocated, small time differences are observable due to high temporal resolution, and different paths are experienced through different beams due to high beam resolution. As a result, it is very unlikely that more than one path will arrive, or depart, at the same angle within the resolution of the beam and with the same flight time within the temporal resolution. As an example, with 1 GHz BW, even small flight distances of less than 1 m are distinguishable. This follows the uncertainty principle and Nyquist sampling rate, where with 1 GHz BW, the temporal resolution is in the order of 1 nanosecond (ns), which is equivalent of 30 cm of electromagnetic wave travel distance.

For path separation, it is proposed in an embodiment to use wideband pilot PN sequences with very good auto correlation properties, repeated with relatively narrow transmit beams. Cross correlation properties being "good" refers to the cross correlation of two different PN sequences being at or near a zero value. Auto correlation properties being "good" refers to the auto correlation of a PN sequence with a delayed version of itself being at or near a value of one when there is no delay (delay=0) and at or near a zero value when the delay between the PN sequence and the delayed version of itself is sufficient, such as when the delay is equal or higher than the chip duration of the PN sequence.

At the receiver, a sweep can be performed over relatively narrow receive beams and the beams can be separated using temporal and beam resolutions. In most scenarios, this is expected to result in a sparsity order of a maximum one nonzero element only. In the unlikely event of multiple paths within the same beam and the same flight time, finer beams may be able to separate them if they are not diffractions or reflections from the same object.

When a Line-of-Sight (LoS) path exists, the direction of the LoS path is often the direction of interest, and that direction can be determined by focusing on the shortest flight time and the beam direction(s) associated with it. THz deployments may be particularly suited to this type of estimation, because without large BW, separation of the shortest flight time may not be feasible.

In mmWave solutions, following a sparse model of the channel, some compressive sensing algorithms detect the channel coefficients. However, with temporal separation of channel coefficients as proposed herein, the sparsity order is reduced to one in some embodiments, and therefore one can directly solve for the channel coefficient.

Consider now embodiments that involve estimating the AoA and AoD using phase difference. In such embodiments, channel coefficients are estimated based on the AoA and AoD of the related path l where l∈{1, 2, . . . , L} and L is the number of distinguishable paths of the channel. This is discussed below by way of example, for estimation of the AoA.

FIG. 1 is a block diagram illustrating an example AoSA antenna system. The example antenna system 100 may include at least two sets of antenna elements, for example, and the example shown includes 4 sets of antenna elements 102, 104, 106, 108, each including one or more antenna elements and each connected to an RF chain. The RF chains are not shown in FIG. 1 so as to avoid further congestion in the drawing. For the purposes of this example, it is presumed that all RF chains utilize the same antenna beam pattern, and four beams having the same beam pattern are shown at 112, 114, 116, 118. More generally, at least two beams may be utilized. The at least two beams may have a same direction. Any of various types of antenna elements and RF chain implementations may be used, and the embodiments disclosed herein are not restricted to any particular implementation. In some examples, in general, an RF chain includes any suitable structure for generating signals for wireless transmission or processing signals that are received wirelessly. In the example shown, each set of antenna elements is distributed within a square area of dimension D by D.

In operation during beam sweeping, each RF chain sweeps its antenna beam 112, 114, 116, 118 over different directions with respect to the XZ plane. A signal is arriving at the antenna elements 102, 104, 106, 108 from a direction within the beam pattern, as shown at 120.

The phase difference experienced by different RF chains is a function of the beam inclination, and by RF chain separation in terms of separation between the antenna element sets that are coupled to the RF chains. In the example shown, there are two inclination angles of the received signal of path l of the channel, including one with respect to the x axis, denoted as $\zeta_{rl}$, and one with respect to the z axis, denoted as $\phi_{rl}$. With $\alpha_{rz}$ denoting a received signal phase difference between a top antenna subarray 102, 104 and a bottom antenna subarray 108, 106 aligned therebelow in the z direction and $\alpha_{rx}$ denoting a received signal phase difference between a left antenna subarray 102, 108 and a right antenna subarray aligned therewith in the x direction, these phase differences can be expressed as follows:

$$\alpha_{rz} = \mathrm{mod}\left(\frac{2\pi D}{\lambda}\cos\phi_{rl}, 2\pi\right), \alpha_{rx} = \mathrm{mod}\left(\frac{2\pi D}{\lambda}\cos\zeta_{rl}, 2\pi\right)$$

where D is as shown in FIG. 1 (length of each subarray) and described above, and λ is wavelength. Note that the phase differences depend on D because of the AoSA structure in FIG. 1, where D also represents the distance between the centers (or respective antenna elements) of subarrays such as subarrays 102 and 104 (and subarrays 108 and 106) in the X direction, and the distance between the centers (or respective antenna elements) of subarrays such as subarrays 102 and 108 (and subarrays 104 and 106) in the Z direction. For other AoSA structures, the distance between different subarrays (serving on the same beam direction) in the X direction and/or in the Z direction can be different.

$\alpha_{rz}$ and $\alpha_{rx}$ can be estimated by calculating the phase of $y_1(t)y_2^*(t)$, where $y_1(t)$ and $y_2(t)$ are received signals on two RF chains coupled to different antenna subarrays that are aligned in one direction, referenced as top and bottom antenna subarrays or left and right antenna subarrays above, and y(t) is the conjugate of $y_2(t)$. The estimates of $\alpha_{rz}$ and $\alpha_{rx}$ can then be used to estimate $\phi_{rl}$ and $\zeta_{rl}$. Note that for $\alpha_{rz}$ estimation in the considered example in FIG. 1, the subarrays that are pertained to $y_1(t)$ and $y_2(t)$ can respectively be 102 and 108 (option 1) or 104 and 106 (option 2). Given these two options, $\alpha_{rz}$ can be estimated from either of them or both of them. When using both of them, multiple ways can be deployed. For example, $\alpha_{rz}$ can be the average of $\alpha_{rz}$ from option 1 and $\alpha_{rz}$ from option 2. Another example is to take the summation of $y_1(t)y_2^*(t)$ in options 1 and 2, $\alpha_{rz}$ is then estimated as the phase of this summation. Similar process holds for $\alpha_{rx}$.

For AoD estimation and the example antenna array in FIG. 1, the following mechanism is used in an embodiment. Again, in this example there are four sets of antenna elements 102, 104, 106, 108 each connected to an RF chain, and each RF chain sweeps its beam over different directions with respect to XZ plane. The four different RF chains, for transmission for the purpose of AoD estimation, use at least 3 different PN sequences with good auto correlation and cross correlation properties. For path l of the channel, the signal departs the antenna elements 102, 104, 106, 108 from a direction within the beam pattern. Hence, $\phi_{tl}$ and $\zeta_{tl}$ are defined similarly to $\phi_{rl}$ and $\zeta_{rl}$ but for the transmitted signal.

The receiver, of a signal in path l of the channel, estimates the phase of the channel experienced by the four PN sequences in this example such that the receiver can obtain 4 received signals from the 4 Tx RF chains. The phase difference experienced from different RF chains is a function of the beam inclination and the RF chain separation. With the phase differences and angles of inclination defined as above but for the transmission side, the phase differences $\alpha_{tz}$ and $\alpha_{tx}$ can be estimated where $\alpha_{tz}$ is the transmit signal phase difference between a top antenna subarray 102, 104 and a bottom antenna subarray 108, 106 while $\alpha_{tx}$ is the received signal phase difference between a left antenna subarray 102, 108 and a right antenna subarray 104, 106. Note that if the transmitter and the receiver have the same AoSA antenna system in FIG. 1, each Tx RF chain can transmit different PN sequence such that each Rx RF chain can separate the signals arrived from different Tx RF chains. Then, given the four received signals at each Rx RF chain and the two options to estimate $\alpha_{rz}$ from each of them, 8 options are available for $\alpha_{rz}$ estimation. Hence, $\alpha_{rz}$ can be estimated using one or more of these options. For example, when using all of these options, $\alpha_{rz}$ is then estimated as the phase of the summation of $y_1(t)y_2^*(t)$ for all 8 options (summation of two options for each of the received signal as explained earlier). Similar holds for $\alpha_{rx}$, $\alpha_{tz}$, and $\alpha_{tx}$. In this example for AoD determination, the phase differences are calculated at the receiver but are to be used by the transmitter. Signaling is used to communicate information from the receiver to the transmitter to indicate the phase differences.

For example, the receiver may send signaling that indicates the values of $\alpha_{tz}$ and $\alpha_{tx}$ to the transmitter. Signaling to carry this phase difference information may take any of various forms. Consider an example of measurements by a user equipment (UE) based on DL reference signaling. The phase differences determined by the UE may be sent back in uplink signaling via an uplink control channel such as physical uplink control channel (PUCCH) or via another channel such as physical uplink shared channel (PUSCH). In a UL measurement scenario, the values of the phase differences may be sent to a UE by a base station or other network equipment through a DL channel such as physical downlink control channel (PDCCH), MAC (media access control or medium access control) signaling, or other DL signaling.

If the receiver is aware of the beam properties and antenna subarray information, such as the value of D in FIG. 1 and the beam pattern used at the transmitter, then the receiver may calculate the AoD and report the AoD to the transmitter. This involves signaling at least to report the AoD values back to the transmitter. In DL based reference signaling, for example, AoD reporting may be through PUSCH, PUCCH, or another uplink channel. The receiver may be aware or made aware of the configuration at the transmitter through radio resource control (RRC) signaling for example. For UL based reference signaling, the AoD values may be sent to a UE through PDCCH, MAC signaling, or other DL signaling, and the beam pattern and antenna configuration may be communicated through RRC signaling or UE category information for example.

These specific signaling examples are illustrative and not intended to be limiting.

The example in FIG. 1 is also not limiting, and the present disclosure can be extended to other numbers of RF chains, shapes, and/or orientations of antenna element subarrays, for example.

Compared to traditional beam refinement, in which beam width is progressively narrowed down, accurate AoA and AoD values may be obtained through relatively wide beams and based on phase difference in some embodiments disclosed herein. This is shown by the MSE of the phase estimates, which is shown by way of example below for $\alpha_{rz}$ $$MSE_{\alpha_{rz}} \cong \frac{\lambda^2}{4\pi^2 D^2 \sin^2\phi_{rl}} \frac{N_0}{E_R G_R G_T}$$

where $E_R$ is the received power per antenna element without beamforming, $N_0$ is the variance of the additive white Gaussian noise (AWGN) of the channel with zero mean and variance $N_0$ and $G_R$ and $G_T$ are beamforming gains.

It should be noted that due to presence of modulo operation in the phase values as defined above, there is ambiguity on those values and any AoA or AoD that is determined based on the phase values. This can be alleviated through other measurements, or if the inclination angle is limited, by beam width for example, to a range of $(\phi_{rl}^{min}, \phi_{rl}^{max})$. If $$\frac{D}{\lambda}(\cos\phi_{rl}^{min} - \cos\phi_{rl}^{max}) \leq 1,$$

there is no ambiguity in the phase.

A similar analysis and similar comments apply to the value of $\alpha_{rx}$, but with $\zeta_{rl}$ instead of $\phi_{rl}$. Similar holds for $\alpha_{tz}$ with $\phi_{tl}$ and $\alpha_{tx}$ with $\zeta_{tl}$.

Some embodiments involve estimation using a single RF chain. In this case there is one RF chain, which may be quite common in a UE for example.

For each inclination direction, two beam patterns may be used in order to provide a basis for comparison. The two beam patterns may cover the same direction but with different precoding vectors, for example. Consider a beamformer $[Q_1 \; Q_2]$ in a first instance and $[Q_1 \; -Q_2]$ in a second instance, where $Q_1$ and $Q_2$ are different sub-precoders of equal lengths, with the same beam directions. An example is $Q_2 = Q_1 \exp(jy)$, where $$\gamma = \exp\left(-\frac{j\pi D}{\lambda}\cos\phi_{mid}\right), j = \sqrt{-1},$$

and D is the side length of the antenna array in the relevant direction, and $\phi_{mid}$ is an inclination angle in the middle of the beam pattern. The two receptions, at different times, can be used to estimate the beam difference. This involves two measurements per AoA inclination measurement in this example. A similar approach is possible for AoD measurement. Signaling may be used to report phase differences or AoD estimates, as in other embodiments.

With this technique, estimation based on phase difference is in effect extended to a single RF chain. The single RF chain is used at multiple times to collect reception signals for comparison.

Another embodiment involves estimating AoA and AoD based on the impact of beam squint.

When BW is very large, a signal arrives at different antenna elements at times that are slightly different but the time difference is comparable to the signal chip rate. This time difference can be used to provide a better estimate of the AoA. Conversely, a signal from different Tx antenna elements arrives at the same Rx antenna elements at slightly different times, again with a time difference that is comparable to the signal chip rate. This time difference can be used to provide a better estimate the AoD. The time difference can be measured by any of various different methods, such as directly by measuring the arrival time at different RF chains or through a correlation value as a result of the choice of the PN sequence. An example of using the correlation value for this purpose is provided below.

Figure 2:
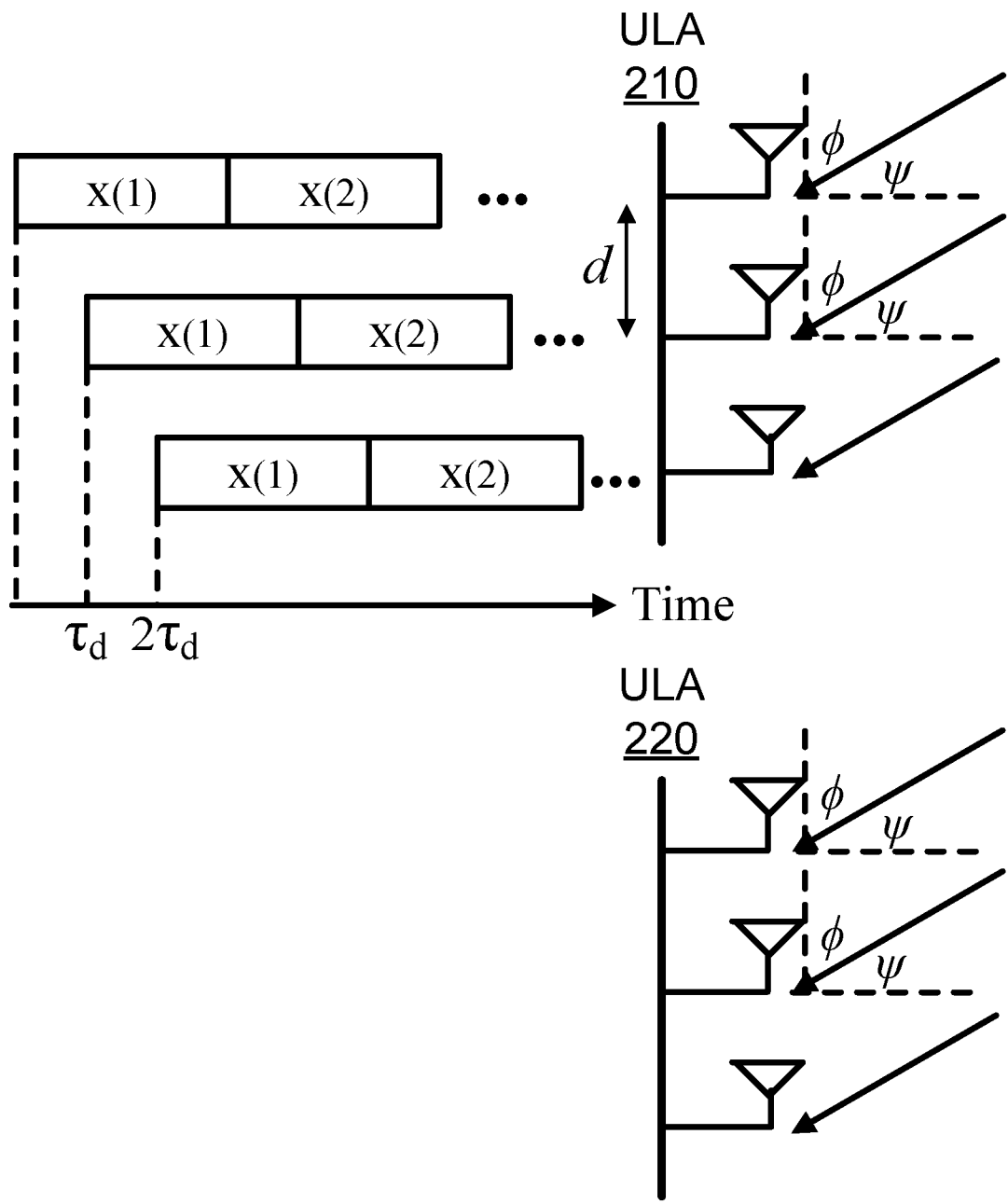
FIG. 2 is a block diagram illustrating an example antenna array.

FIG. 2 is a block diagram illustrating an example antenna array that includes two uniform linear arrays (ULAs) 210, 220, each connected to a respective RF chain. As noted above for FIG. 1, the RF chains are not shown in FIG. 2 in order to avoid further congestion in the drawings, but for this example a system with a disconnected array of subarrays including two ULAs 210, 220 and two RF chains is considered. Each of the ULAs 210, 220 includes multiple antenna elements. Due to the beam squint effect, the received signal (x) at different adjacent antennas is delayed by ($\tau_d$), which depends on the AoA and inter-antenna spacing d, as shown in the drawing.

Either or both of AoA and AoD may be estimated by utilizing the impact of beam squint on the auto correlation function of a Maximum Length (ML) Pseudo-Noise (PN) pilot sequences. Suppose for the purpose of illustration that both ULAs 210, 220 utilize the same beam pattern and that beam sweeping is performed. AoA $\psi$ as shown in FIG. 2 is relative to the boresight of the array, and may be related to inclination angle $\phi$ as referenced elsewhere herein by $$\left(\psi = \frac{\pi}{2} - \phi\right),$$

for example.

With beam squint, the time delay $\tau_d$ depends on $\psi$, with $\tau_d$=d sin($\psi$)/c, where c is the speed of light. Therefore, on channel or path l, the cross correlation (<$Y_1$(t),X(t)>) of the received signal ($Y_1$) at RF chain 1 that is coupled to the ULA 210, with the pilot sequence (X(t)) is reduced compared to that without beam squint. Such cross correlation $\rho_1$ may be expressed as follows:

$$\rho_1 = \ < Y_1(t),$$
$$X(t) > = h_l \sqrt{E_x} \sum_{m=0}^{(M'-1)} w_m e^{-j2\pi m \tau_d f_c}(1-\eta|m\tau_d|),$$
$$\eta = \frac{N_c + 1}{N_c T_c}$$

where $h_l$ is the channel coefficient of path l, $E_X$ is the energy of X, M' is the number of antennas in each ULA 210, 220, w is a beamformer vector, $N_c$ is the length of the pilot sequence, and $T_c$ is the chip duration. Noise is ignored for simplicity. Note that without beam squint or when the signal arrives from the boresight ($\psi$=0), $\tau_d$=0. A cross correlation of the received signal ($Y_2$) at RF chain 2 that is coupled to the ULA 220 can be expressed in a similar manner where both RF chains have the same beamformer.

These cross correlations are related to AoA and can be used to estimate $\psi$ from the ratio $|\rho_2|^2/|\rho_1|^2$, which for example can be the ratio of the RSSI2/RSSI1 or the ratio of signal to noise ratios (SNRs) when $Y_1$ and $Y_2$ are each affected by independent additive white Gaussian noise (AWGN) with zero mean and variance $N_0$. This enables an AoA estimation and beam acquisition approach that involves beam sweeping, beam selection based on the highest SNR for example, and AoA estimation from $|\rho_2|^2/|\rho_1|^2$. A narrow beam can then be formed in the direction of the determined AoA. Note that this AoA estimation is different from the amplitude comparison technique of monopulse radar that is adapted to MIMO systems. For the adapted radar technique, the difference of the RSSIs or SNRs stems from tilting the beam direction, whereas according to embodiments disclosed herein, the difference stems from the beam squint effect.

AoD may be determined in a substantially similar way, but based on measurements at a device that receives reference signaling that is transmitted using the ULAs 210, 220. Similar to other embodiments, signaling may be used in embodiments that are based on beam squint, to convey values of correlations, or more generally another metric representing the time difference, to the transmitter or to inform the transmitter of AoD values if AoD is estimated at the receiver.

With this technique and with beam sweeping, AoA and AoD can be estimated. The range of estimation error from this technique can be narrower than the beam width itself. Also, the estimation accuracy may be improved and the range of estimation error may be narrowed as bandwidth gets larger but the same beam width is used for beam sweeping.

Several illustrative example embodiments are described above. By way of further explanation, these embodiments can be considered in the context of a system model, in which it is assumed that antennas at each of a transmitter side and a receiver side are in a two dimensional (2D) array. There are $N_T = N_{T_r} \times N_{T_c}$ transmitter antenna elements, where $N_{T_r}$ is the number of rows and $N_{T_c}$ is the number of columns, and similarly $N_R = N_{R_r} \times N_{R_c}$ receiver antenna elements, where $N_{R_r}$ is the number of rows and $N_{R_c}$ is the number of columns. The channel comprises L paths, each with delay $\tau_l$, l=1, . . . , L, and departure and arrival angles of $\theta_{tl}$, $\phi_{tl}$, $\theta_{rl}$, $\phi_{rl}$ in the standard mathematical spherical coordinate system, with $\theta_{tl}$ and $\theta_{rl}$ denoting the departure and arrival azimuthal angles, respectively, associated with path l, and $\phi_{tl}$ and $\phi_{rl}$ denoting the departure and arrival polar angles, respectively, associated with path l. The channel coefficients associated with path l are denoted by $h_l$. Adjacent antenna elements are separated by a distance d.

With this channel model, which is an illustrative and non-limiting example, it can be shown that the time variant impulse response $h_{(m_R,n_R)(m_T,n_T)}(t,t_T)$ of the channel between antenna element ($m_T$, $n_T$) at the transmitter and antenna element ($m_R$,$n_R$) at the receiver is denoted by $h_{(m_R,n_R)(m_T,n_T)}(t, t_T)$ where:

$$h_{(m_R,n_R)(m_T,n_T)}(t, t_T) = \sum_l h_l(t_T) = \delta(t - \tau_l)$$

$$\exp\left(-\frac{j2\pi d}{\lambda}(m_T\cos\theta_{tl}\sin\phi_{tl} + n_T\cos\phi_{tl} + m_R\cos\theta_{rl}\sin\phi_{rl} + n_R\cos\phi_{rl})\right),$$

$t_T$ is the time stamp of the departure of the transmitted signal and t is the flight time between the transmitter and the receiver. For a time invariant channel, the time stamp can be dropped:

$$h_{(m_R,n_R)(m_T,n_T)}(t) = \sum_l h_l \delta(t - \tau_l)$$

$$\exp\left(-\frac{j2\pi d}{\lambda}(m_T\cos\theta_{tl}\sin\phi_{tl} + n_T\cos\phi_{tl} + m_R\cos\theta_{rl}\sin\phi_{rl} + n_R\cos\phi_{rl})\right)$$

Without loss of generality, it is assumed that the time reference is with respect to an LoS path (shown by zero delay) and all other paths are represented by their flight time difference with respect to the LoS path. In the above model, it is assumed that diffraction is limited and can be ignored, and at the moment it is assumed that beam squint is negligible. Under these conditions:

$$H(t) = \sum_l h_l \delta(t - \tau_l)(A_{rl} \boxtimes B_{rl})^T (A_{tl} \boxtimes B_{tl})$$

where $$A_{rl} = \begin{bmatrix} a_{rl}^0 & \cdots & a_{rl}^{N_{Rc}-1} \end{bmatrix}, B_{rl} = \begin{bmatrix} b_{rl}^0 & \cdots & b_{rl}^{N_{Rr}-1} \end{bmatrix},$$

$$A_{tl} = \begin{bmatrix} a_{tl}^0 & \cdots & a_{tl}^{N_{Tc}-1} \end{bmatrix}, B_{tl} = \begin{bmatrix} b_{tl}^0 & \cdots & b_{tl}^{N_{Tr}-1} \end{bmatrix},$$

$$a_{tl} = \exp\left(-\frac{j2\pi d}{\lambda}\cos\theta_{tl}\sin\phi_{tl}\right), a_{rl} = \exp\left(-\frac{j2\pi d}{\lambda}\cos\theta_{rl}\sin\phi_{rl}\right),$$

$$b_{tl} = \exp\left(-\frac{j2\pi d}{\lambda}\cos\phi_{tl}\right), b_{rl} = \exp\left(-\frac{j2\pi d}{\lambda}\cos\phi_{rl}\right),$$

and ⊠ represents the Kronecker product. This formula represents the channel between all transmit antennas and all receive antennas, where the channel between each transmit and receive antenna is given in the previous formula.

With the above sparse representation, the channel comprises L paths, each associated with a complex number for the channel coefficient $h_l$, one real value for the delay $\tau_l$ for each path except the LoS path, and four real values for the AoA and AoDs. Therefore, the total number of real values required to represent channel is 7L−1.

With an AoSA structure, the received signal can be shown as $$Y(t+t_T) = Q(\tau)H(t,t_T)P(\tau) \otimes X(t+t_T) + z(t+t_T)$$

where Q and P are analog beamformers/precoders used at time stamp $t_T$, ⊗ represents convolution, and z(t) represents noise. In the case of a non-overlapped AoSA structure, Q and P can be shown as block diagonal matrices such that there are no rows in P with more than one nonzero element and no columns in Q with more than one nonzero element. In the above expression for the received signal, it is assumed that over the duration of transmission at time stamp $t_T$, the channel remains constant.

Focusing on time stamp 0, if signal x(t) is selected with good auto correlation, then $<X(t),X(t+\Delta t)>\cong 0$ for sufficiently large $\Delta t$. A cross correlation function between functions x(t) and y(t) over transmission duration T is defined as $$<x(t), y(t)> = \int_0^T x(t)y^H(t).$$

For a good PN sequence, transmission bandwidth B, and $\Delta tB>1$, the auto correlation function is very low and proportional to 1/BT.

In that case, if different path delays are larger than 1/B, the cross correlation of the received signal with $x(t-\tau_l)$ can be written as $$\rho_{\tau_l} = <Y(t),X(t-\tau_l)> = \sqrt{E_X} h_l Q(A_{rl} \boxtimes B_{rl})^T (A_{tl} \boxtimes B_{tl}) P + z_X$$

with the assumption that $<X(t),X(t)>=I$, where I is the identity matrix, $E_X$ is the transmit energy of X and $z_X$ is the noise projected on X(t) which is Gaussian with energy $N_0$ assuming unit energy for precoders P and Q.

Some embodiments use different beamformers $P_k$, $Q_k$, k=1, . . . , K for K different time stamps. For ease of illustration, it is assumed that the channel remains constant over all K time stamps and none of the values change. The channel might not remain constant over all K time stamps and one or more of the values may change in actual practice of embodiments consistent with the present disclosure.

Regarding time or temporal separation, by finding the cross correlation over all the K time stamps, it is possible to find the L time delays and sparse detection will be limited to one path, or a limited number of paths in the unlikely event that there is more than one reflected path with relative delay comparable to 1/B. In an example, it is not necessary to accurately estimate time delay values. Time delay values could be estimated accurately enough that the paths can be separated in time. In that case, by simple temporal filtering, each path can be individually estimated.

As an example, consider the special case of two RF chains and two vertical ULAs in the receiver, each with one row of $N_R$ antenna elements as shown at 210 and 220 in FIG. 2, and one RF chain at the transmitter. In this example, the inclination angle is important. Further suppose that at time stamp k, both RF chains use the same beamformer ($Q_{k1}$). Then $$Q_k = \begin{bmatrix} Q_{k1} & 0 \\ 0 & Q_{k1} \end{bmatrix},$$

where $Q_{k1}$ is a row vector of length $N_R$ and 0 here is a row vector of zeros of length $N_R$. In that case, ignoring the effect of noise:

$$\rho_{rl}\rho_{rl}^H = E_X \|h_l Q_{k1} A_{rl}^T B_{rl} P_k\|^2 \begin{bmatrix} 1 & \exp\left(-\frac{j2\pi d}{\lambda}\frac{N_R}{2}\cos\phi_{rl}\right) \\ \exp\left(\frac{j2\pi d}{\lambda}\frac{N_R}{2}\cos\phi_{rl}\right) & 1 \end{bmatrix}$$

The phase of the covariance of the received signal shows the direction of the arrival, albeit with some ambiguity. However, that ambiguity can be resolved knowing which directions are covered by vector $Q_{k1}$. It is worth noting that with this approach, the receive and transmit beams do not need to be very narrow to achieve accurate AoA and AoD estimations. However, these beams also should not be very wide, to help avoid ambiguity due to phase wrapping. Example beam widths are provided elsewhere herein.

All the transmit and receive antennas may cooperate simultaneously. Among all beam pairs $P_k$ and $Q_k$, a few are likely to have relatively high power $E_X\|h_l Q_{k1} A_{rl}^T B_{rl} P_k\|^2$ and it is possible to focus on the directions associated with those direction pairs or on some of the directions.

Similarly, if there are two RF chains at the transmitter and one RF chain at the receiver, and both Tx RF chains use the same beam matrix $$P_k = \begin{bmatrix} P_{k1} & 0 \\ 0 & P_{k1} \end{bmatrix},$$

where $P_{k1}$ is a column vector of length $N_T$ and 0 here is a column vector of zeros of length $N_T$, and the signal $$X(t) = \begin{bmatrix} x_1(t) \\ x_2(t) \end{bmatrix},$$

where $x_1(t)$ and $x_2(t)$ have low auto and cross-correlation, then $$\rho_{rl}\rho_{rl}^H =$$

$$E_X \|h_l Q_k A_{rl}^T B_{rl} P_{k1}\|^2 \begin{bmatrix} 1 & \exp\left(-\frac{j2\pi d}{\lambda}\frac{N_T}{2}\cos\phi_{tl}\right) \\ \exp\left(\frac{j2\pi d}{\lambda}\frac{N_T}{2}\cos\phi_{tl}\right) & 1 \end{bmatrix}$$

Again, the phase of the received signals can be used to calculate or otherwise determine the AoD at the transmitter.

The above example of two Tx RF chains and one Rx RF chain can be extended to multiple RF chains and a 2D antenna setup at each side. This is further explored below, in the context of Signal to Noise Ratio (SNR) and potential ambiguity of AoA and AoD calculations. Note that in case of any source of interference (e.g. from other signals or transmitters), SNR can refer to the Signal to Interference Noise Ratio (SINR).

Suppose that two or more receive beams used in an AoSA structure, that received signal phase difference, denoted by $\alpha_{rz}$, is calculated based on two beams whose centers are apart by $N_D d$ (with $N_D = N_R/2$ from the example above) in the z direction. With the focus to find the AoA in the inclination domain shown by $\phi_{rl}$, $\phi_{rl}$ can be estimated as a function of $\alpha_{rz}$ satisfying the following formula:

$$\alpha_{rz} = \mathrm{mod}\left(\frac{2\pi d}{\lambda}N_D\cos\phi_{rl}, 2\pi\right) \Leftrightarrow \phi_{rl} = \cos^{-1}\frac{\lambda}{2\pi d N_D}(\alpha_{rz} + 2c_{r\phi}\pi),$$

$$c_{r\phi} \in \mathbb{Z}$$

where $c_{r\phi}$ is an integer (that is, $\mathbb{Z}$ denotes the set of integers $\{\ldots, -2, -1, 0, 1, 2, \ldots\}$) and $2c_{r\phi}\pi$ represents the phase wrapping ambiguity for $\phi_{rl}$.

There are three messages to take away from this equation:

1) The accuracy associated with the AoA is much higher than the phase difference. The SNR of the AoA ($\phi_{rl}$) is actually proportional to $N_D^2$, compared to that of $\alpha_{rz}$, which is usually accurate within a fraction of a radian.

2) The derivative of $\phi_{rl}$ with respect to $\alpha_{rz}$ increases as the beam reaches so-called "end-fire" (where $|\cos \phi_{rl}| \cong 1$). Therefore, this technique does not improve the estimation of the AoA and AoD compared to the width of the receive and transmit beams if the receiver is located near the end-fire beam direction, which corresponds to the receiver at a position above or below antenna panels in this example.

However, for most of the directions of interest, this results in Frequency Modulation (FM)-like SNR enhancement, which results in a much better Mean Square Error (MSE) measurement for $\phi_{rl}$ compared to that of $\alpha_{rz}$.

3) There may be ambiguity on determining the actual beam direction that is derived from the choice of the integer value $c_{r\phi}$. The range for $c_{r\phi}$ is limited to the beamforming matrix $Q_k$. If the original beam covers a region of space for which $$\phi_{rl}^{max} < \phi_{rl} < \phi_{rl}^{max},$$

$$\text{then } \frac{\frac{2\pi d N_D}{\lambda}\cos\phi_{rl}^{max} - \alpha_{rz}}{2\pi} < c_{r\phi} < \frac{\frac{2\pi d N_D}{\lambda}\cos\phi_{rl}^{min} - \alpha_{rz}}{2\pi}.$$

With a reasonable choice of beamformers $Q_k$ and multiple measurements, for example, ambiguity can be resolved.

It is worth noting that polar angles and azimuthal angles are defined differently, and hence the derivations with respect to these two angles are different. However, to find the beam direction with respect to antenna elements in the same row, a better approach may be to use the inclination angle with respect to the x-axis, defined herein as $\zeta$, to re-write the same equations for the beam direction in the azimuthal direction. $\cos \zeta = \sin \phi \cos \theta$ and hence, if the phase difference for two beams with centers separated by $N_D d$ in the x direction, and a phase different of $\alpha_{rx}$ is measured, then $$\zeta_{rl} = \cos^{-1}\frac{\lambda}{2\pi d N_D}(\alpha_{rx} + 2c_{r\zeta}\pi), c_{r\zeta} \in \mathbb{Z}$$

where $C_{r\zeta}$ is an integer and $2c_{r\zeta}\pi$ represents phase wrapping ambiguity for $\zeta_{rl}$.

Similarly, considering the AoSA system in FIG. 1 but in Tx side, if the two signals from the two Tx RF chains located in the z or x direction are received at the same Rx RF chain with phase differences of $\alpha_{tz}$ and $\alpha_{tx}$, respectively, then $$\phi_{tl} = \cos^{-1}\frac{\lambda}{2\pi d N_D}(\alpha_{tz} + 2c_{t\phi}\pi), c_{t\phi} \in \mathbb{Z}$$

$$\zeta_{tl} = \cos^{-1}\frac{\lambda}{2\pi d N_D}(\alpha_{tx} + 2c_{t\zeta}\pi), c_{t\zeta} \in \mathbb{Z}$$

where $c_{t\phi}$ and $c_{t\zeta}$ are integers, and $2c_{t\phi}\pi$ and $2c_{t\zeta}\pi$ represent the phase wrapping ambiguity for $\phi_{tl}$ and $\zeta_{tl}$, respectively.

If there are 2D antenna setups and 4 RF chains each connected to one quarter of the antenna elements, then both the azimuthal and polar angles can be derived simultaneously.

During a hierarchical beam refinement process, the receive beamforming matrices Q for different directions can be narrowed down without any feedback to the transmitter. In an open loop scenario, P matrices are pre-assigned and cannot be optimized during an optimization procedure. However, if the system is closed loop, then P matrices can also be narrowed down to useful directions.

If signals on more than one path coming from different directions arrive within the same time frame and are not distinguishable through time, then depending on the direction of Q, different values for the AoA and AoD are observable.

Once the AoA and AoD are known from all directions, the L complex numbers related to the channel coefficients can be determined using the K×L measurements of the channel. Note that the K×L measurements are based on K time stamps, each with correlation with delays of $\tau_l$, $l=1, \ldots, L$. Furthermore, because narrow beams can be formed toward one direction or a few directions, such as those with the highest RSSIs or SNRs for example, the AoA and AoD can be estimated for some of the L paths instead of all of them.

Note that using two inclinations in the above example does not distinguish points on two sides of the XZ plane of FIG. 1 for example, assuming that each set of antennas is located at its own local coordinates and on its XZ plane. The two XZ planes do not need to be parallel or have the same orientation. However, for a 2D antenna system, the beamformers generate beams that are symmetric with respect to the antenna plane, and hence no information is lost with this aspect. This a result of the beamformers, and not due to an intrinsic antenna element pattern. This phenomenon can be shown by the fact that the rear of an XZ plane is shown by azimuthal angles between $\pi$ and $2\pi$ but the example beamforming formulas herein use $\cos\theta$, which does not distinguish between the front and rear of the XZ plane.

Some embodiments consistent with the present disclosure involve using a single RF chain. In the case of one RF chain at the receiver or transmitter, multiple RF chains can in effect be simulated using partial antenna patterns.

When some antenna elements can be turned off, for example, the same transmission can be repeated with different antenna elements, such as once with the top half of antenna elements active and once with the bottom half of antenna elements active. This is equivalent to using the following precoders at time stamps $t_T$ and $t_T+1$: $[Q_1\ 0]$ and $[0\ Q_1]$ at the receiver or $[P_1\ 0]$ and $[0\ P_1]$ at the transmitter.

Another possible option, if all antenna elements should be used and phase can be adjusted, for example, is to use one antenna pattern in a first transmission with a repetition of the coefficients between different antenna elements, such as top and bottom antenna elements as referenced above, and then change the phases of the bottom antenna elements in the next time slot, by a certain value such as $\pi$. Two RF chains can then be emulated, by a simple Hadamard transformation. This is the equivalent of using the following precoders at time stamps $t_T$ and $t_T+1$: $[Q_1\ Q_1]$ and $[Q_1\ -Q_1]$ at the receiver or $[P_1\ P_1]$ and $[P_1\ -P_1]$ at the transmitter.

In the above examples described in the context of an illustrative system model, the SNR of the $l^{th}$ path is:
proportional to transmit power spectral density;
quadratically proportional to $\|h_l\|$, which is inversely proportional to path loss of the $l^{th}$ path;
proportional to beam gain of matrices P and Q when they are in line with AoA and AoD of the $l^{th}$ path, which is inversely proportional to the beam width of P and Q;
proportional to pilot length, which is proportional to the bandwidth and time duration of the signal;
inversely proportional to noise power spectrum density.

Regarding pilot length, if BW is larger, then with the same total transmit power, the transmit power density decreases. Also, $E_X$ which is the energy of the pilot, can be written as the transmit power spectral density multiplied by the pilot BW, multiplied by the pilot time duration.

Note that due to nonzero cross correlation, the SNR is upper bounded by the pilot length. In other words, even in the absence of noise, the SNR is limited by the cross correlation values.

Consider now an example of a detailed MSE calculation of phase difference. As the analyses are similar to all phase differences, consider the MSE calculation of $\alpha_{rz}$ (that is, $MSE_{\alpha_{rz}}$). For the purpose of illustration, assume that a beamformer for $Q_1$ is designed to cover a solid angle consisting of a beam with widths $W_{rd}$ and $W_{rp}$ in both defined in radian. Furthermore, assume that the beam is flat in the location of the beam and zero everywhere else. In this case, the beam gain can be described as $$G_R = \frac{4\pi}{W_{rd}W_{rp}}.$$

Similarly, the seam gain associated with precoder P can be found. If the $l^{th}$ path falls into both transmitter and receiver beams, then the term $\|E_x h_l Q A_{rl}^T B_{rl} P_{k1}\|^2$ can be described as $E_x\|h_l\|^2 G_R G_T$. If the measured phase difference is $\alpha_{rz}$, and the noise free phase difference is $\alpha_{rz}$, then the effect of the noise can be shown as $$\rho_{\tau_l}(1)\rho_{\tau_l}^H(2) = E_x\|h_l\|^2 G_R G_T \exp(j\alpha_{rz}) + \sqrt{E_x\|h_l\|^2 G_R G_T}\,(z_1 + z_2^H \exp(j\alpha_{rz})) + z_1 z_2^H$$

For high SNR of the $l^{th}$ path $$\left(SNR_l = \frac{E_x\|h_l\|^2}{N_0}\right),$$

the multiplicative term of the noises can be ignored and the additive term can be replaced with a Gaussian noise with variance $2N_0$. This noise has two components, one perpendicular to the vector $E_x\|h_l\|^2 G_R G_T \exp(j\alpha_{rz})$ and one in phase, each with variance $N_0$. At higher SNR values, the in phase term does not impact the result and the MSE of the phase measurement can be shown as $$MSE_{\alpha_{rz}} = \frac{E_x\|h_l\|^2 G_R G_T N_0}{(E_x\|h_l\|^2 G_R G_T)^2} = \frac{N_0}{E_x\|h_l\|^2 G_R G_T} = \frac{N_0}{P_T\|h_l\|^2 G_R G_T T_X}$$

where $E_x = P_T T_x$, where $P_T$ is the transmit power and $T_X$ is the time length of the pilot X.

With $$\frac{d\phi_{rl}}{d\alpha_{rz}} = -\frac{\frac{\lambda}{2\pi d N_D}}{\sqrt{1 - \left(\frac{\lambda}{2\pi d N_D}(\alpha_{rz} + 2c_{r\phi}\pi)\right)^2}}$$

then $$MSE_{\phi_{rl}} = \frac{N_0}{\|h_l\|^2 P_T G_R G_T T_X} \frac{\frac{\lambda}{2\pi d N_D}}{1 - \left(\frac{\lambda}{2\pi d N_D}(\alpha_{rz} + 2c_{r\phi}\pi)\right)^2}$$

and similar expressions can be derived for MSE of other angles $\zeta_{rl}$, $\phi_{tl}$, and $\zeta_{tl}$.

One observation on the MSE of the phase is that, with beam sweeping to cover multiple directions around both the transmitter and the receiver, the total overhead of sweeping is proportional to the inverse of the gains of the transmitter and the receiver, and the MSE of the measured phase difference can be rewritten as $$MSE_{\alpha_{rz}} = \frac{N_0}{\|h_l\|^2 P_T T_{sweep}} \frac{\Omega_T}{4\pi} \frac{\Omega_R}{4\pi}$$

where $T_{sweep}$ is the total time spent to sweep the beams and $\Omega_T$ and $\Omega_R$ are the solid angles of sweeping around the transmitter and the receiver, respectively. If each of the transmitter and the receiver sweeps all possible solid angles, then these values are each $4\pi$. However, in most cases, an antenna panel sweeps a certain set of beam directions, for example up to 120 degrees in the azimuth direction in a tri-sector deployment.

Regarding beamformer design, to estimate the channel beamforming accuracy is to be determined. In the above example, a target angular accuracy is selected. An over-accurate estimation might not be helpful. For example, beam width is inversely proportional to the number of antenna elements in either z or x direction in the case of a 2D array in FIG. 1. With this in mind, a certain target MSE of the inclination angles with respect to X and Z axes may be defined. The center of each beam determines the target value of the integers $c_{r\phi}$, $c_{rz}$, $c_{t\phi}$, and $c_{tz}$. In order to avoid potential ambiguity, the width of the beam can be determined so as to limit the range of ambiguity and precisely determine AoA-related phases.

As an example, assume that the beam is located at inclination of 60 degrees to an antenna panel, which is equal to 30 degrees from the boresight of the panel, and that the target accuracy of the AoA is 1 degree, while the accuracy of the phase difference calculation is 30 degrees. A phase difference accuracy of $$\frac{\pi}{6}$$

is associated with an MSE of $$\left(\frac{\pi}{12}\right)^2,$$

assuming that the accuracy is within $\pm 2\sqrt{MSE}$ from the mean. With $$\frac{d\phi_{rl}}{d\alpha_{rz}} = -\frac{\frac{\lambda}{2\pi d N_D}}{\sqrt{1 - \left(\frac{\lambda}{2\pi d N_D}(\alpha_\gamma + 2c_{r\phi}\pi)\right)^2}}$$

and given the target accuracy of 1 degree is 30 times better than the 30 degree accuracy phase difference calculation in this example, with $$\frac{\lambda}{2\pi d N_D}(\alpha_{rz} + 2c_{r\phi}\pi) \cong \cos\frac{\pi}{3} = \frac{1}{2},$$

then the target accuracy is satisfied with $$\frac{\lambda}{2\pi d N_D} = \frac{\sqrt{3}}{60},$$

which means that if half the wavelength spacing is used, $N_D \approx 11$. In other words, the phase difference of beams that are separated by 11 antenna elements provides the target accuracy.

In order to limit the ambiguity for values of AoA, the range of the value $c_{r\phi}$ should be set equal to or less than one. This means that $$\frac{\frac{2\pi d N_D}{\lambda}\cos\phi_{rl}^{min} - \alpha_{rz}}{2\pi} - \frac{\frac{2\pi d N_D}{\lambda}\cos\phi_{rl}^{max} - \alpha_{rz}}{2\pi} \le 1$$

or equivalently, $$\frac{2\pi d N_D}{\lambda}(\cos\phi_{rl}^{min} - \cos\phi_{rl}^{max}) <= 2\pi$$

which results in $N_D(\cos \phi_{rl}^{min} - \cos \phi_{rl}^{max})$ 2. This can be shown as $$2N_D \sin\frac{\phi_{rl}^{max} - \phi_{rl}^{min}}{2} \sin\frac{\phi_{rl}^{max} + \phi_{rl}^{min}}{2} \le 2$$

where $\phi_{rl}^{max} - \phi_{rl}^{min}$ is the beam width W and $$\frac{\phi_{rl}^{max} + \phi_{rl}^{min}}{2}$$

is the center of the beam, which was assumed in this example to be 60 degrees. With $N_D=11$, this reduces to $$11\sin\frac{W}{2}\sin\frac{\pi}{3} \le 1 \Rightarrow \sin\frac{W}{2} \le 0.105 \Rightarrow W \le 0.21 \text{ rad} = 12°$$

or in other words, 11 antenna element spacing equals a beam width of 12 degrees. Therefore, starting with a beam width of 12 degrees or smaller and a pilot with enough SNR to estimate the phase difference within 30 degrees, an accuracy of 1 degree in the beam direction can be acquired. For THz deployments, in some examples, starting beam width may be narrower than 12 degrees to achieve desired SNR.

At this point, it may be useful to consider some simulation results. For simulation in one example, it was assumed that antenna panels at each of network equipment and a UE included 4 subarrays as in FIG. 1, each with 36 antenna elements arranged in a 6×6 square and separated by half the wavelength. The four subarrays themselves are arranged in the shape of a 2×2 square, with the subarray centers separated by three wavelengths. The center frequency for simulation is 150 GHz and the bandwidth is 1 GHz. Network equipment antenna elements are with 8 dBi gain and 130 degrees 3-dB width pattern in both azimuth and elevation. These numbers for UE antennas are assumed to be 180 degrees and 5 dBi in simulations. 81 beams were made on each of a transmitter side and a receiver side by making 9 beam options on each of x and z directions of each of the transmitter and the receiver. The resulting beam set at each of the transmitter and receiver is composed of 81 beams, each covering a small region of the space which spans a 9×9 matrix in the horizontal and vertical directions. Beams with an angle of arrival or departure within 80 degrees from the center were estimated. The motivations were as follows: 1) antenna beam patterns; 2) multiple sectors at the network equipment; and 3) usage of multiple antenna patches on different sides of the UE. Therefore, the width of each beam on each side is 160/9=17.8 degrees.

Figure 3:
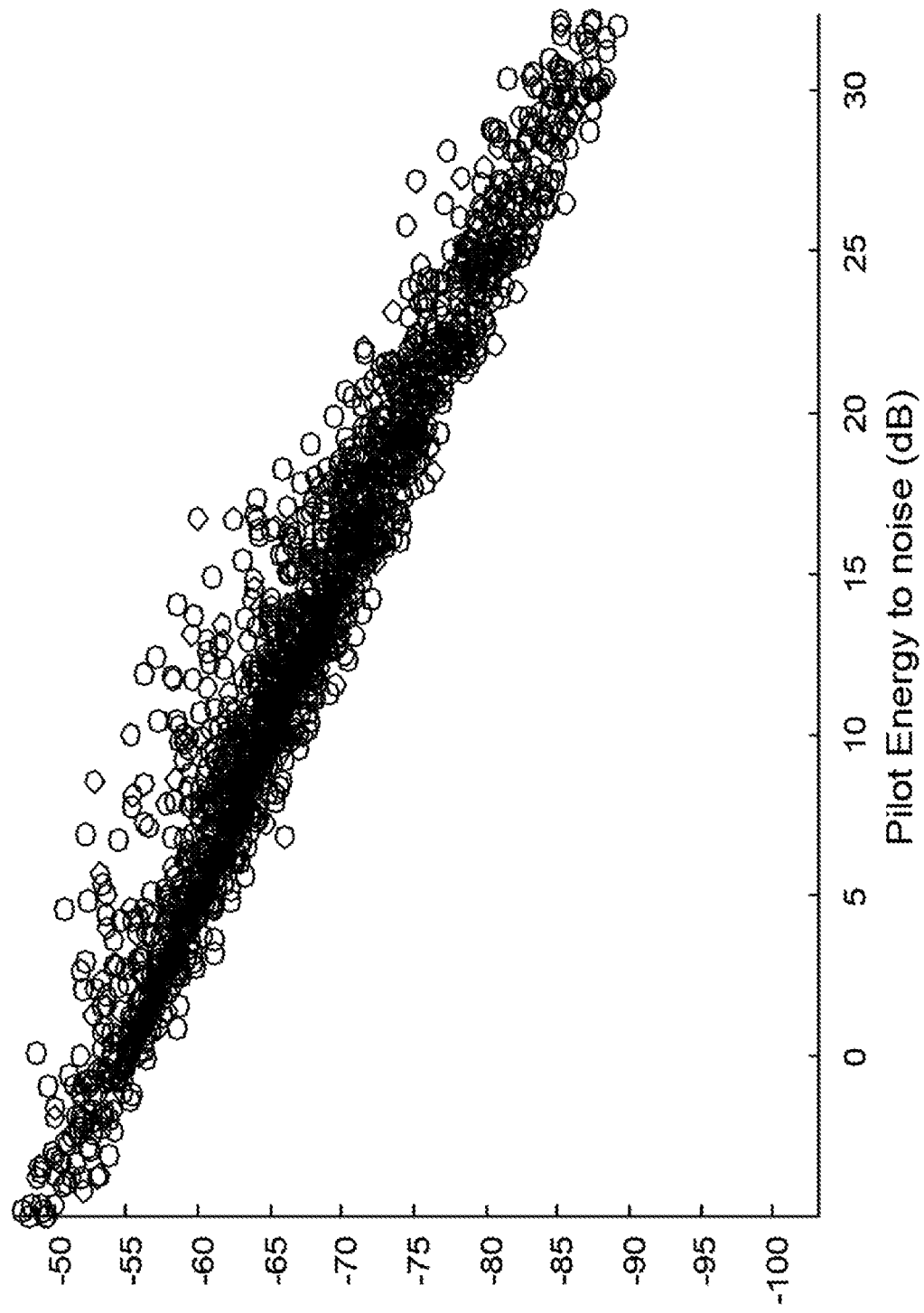
FIG. 3 is a plot of simulation results, showing Mean Square Error (MSE) of an estimated direction versus received pilot energy to noise ratio.

FIG. 3 is a plot of simulation results, showing MSE in dB=10*log 10(MSE) where MSE is the mean square error of the estimated angle in rad versus received pilot energy to noise ratio in dB under these simulation conditions, and when there is no ambiguity of the c values ($c_{r\phi}$, $c_{r\zeta}$, $c_{t\phi}$, and $c_{t\zeta}$) for any of the 4 underlying angles in this example. For these and any other simulation results presented herein, similar or different results may be observed under similar or different simulation conditions or operating conditions.

These results show an almost 55 dB gain of the MSE in dB to the pilot SNR. That can be explained as follows:

1) There are 8 different paths for each angle estimation. For example, for elevation in the transmitter, there are two side by side pairs at the transmitter and there are 4 receiver panels, which results in a 9 dB gain.

2) The beam width in each direction is 0.31 rad, which makes the beam solid angle 0.0963 sr. The beam gain $$\frac{(4\pi)^2}{\Omega_T \Omega_R} = 17037 = 42.3 \text{ dB},$$

based on an assumption that the beam is flat over the beam direction.

3) By ignoring the denominator in the angular MSE gain for signals coming almost perpendicular to the receiver or emitting perpendicular from transmitter $$\left(\frac{2\pi d N_D}{\lambda}\right)^2 = 355 = 25.5 \text{ dB}.$$

4) The transmit power is divided between 4 panels so, there is a gain of −6 dB.

5) The SNR axis already includes the antenna element gains which are 5 dB and 8 dB respectively, resulting in a gain of −13 dB. Again this is based on an approximation that uses an assumption that the antenna element patterns are flat.

Combining the above, estimated SNR gain is 57.8 dB based on the noted approximations or assumptions, which is a good match with the simulated results. At medium SNRs up to 10 dB, there is a possibility of some ambiguity in the $c_{r\zeta}$, $c_{r\phi}$, $c_{t\zeta}$, $c_{t\phi}$ values, which may result in incorrect estimation of the angles (not shown in FIG. 3). Such ambiguity can be reduced by further examining the beam through narrower beam sweeps for example, or retransmission of the beam. Other methods of reducing the range of the possible beam angles can also or instead be used to reduce the possibility of ambiguity.

Figure 4:
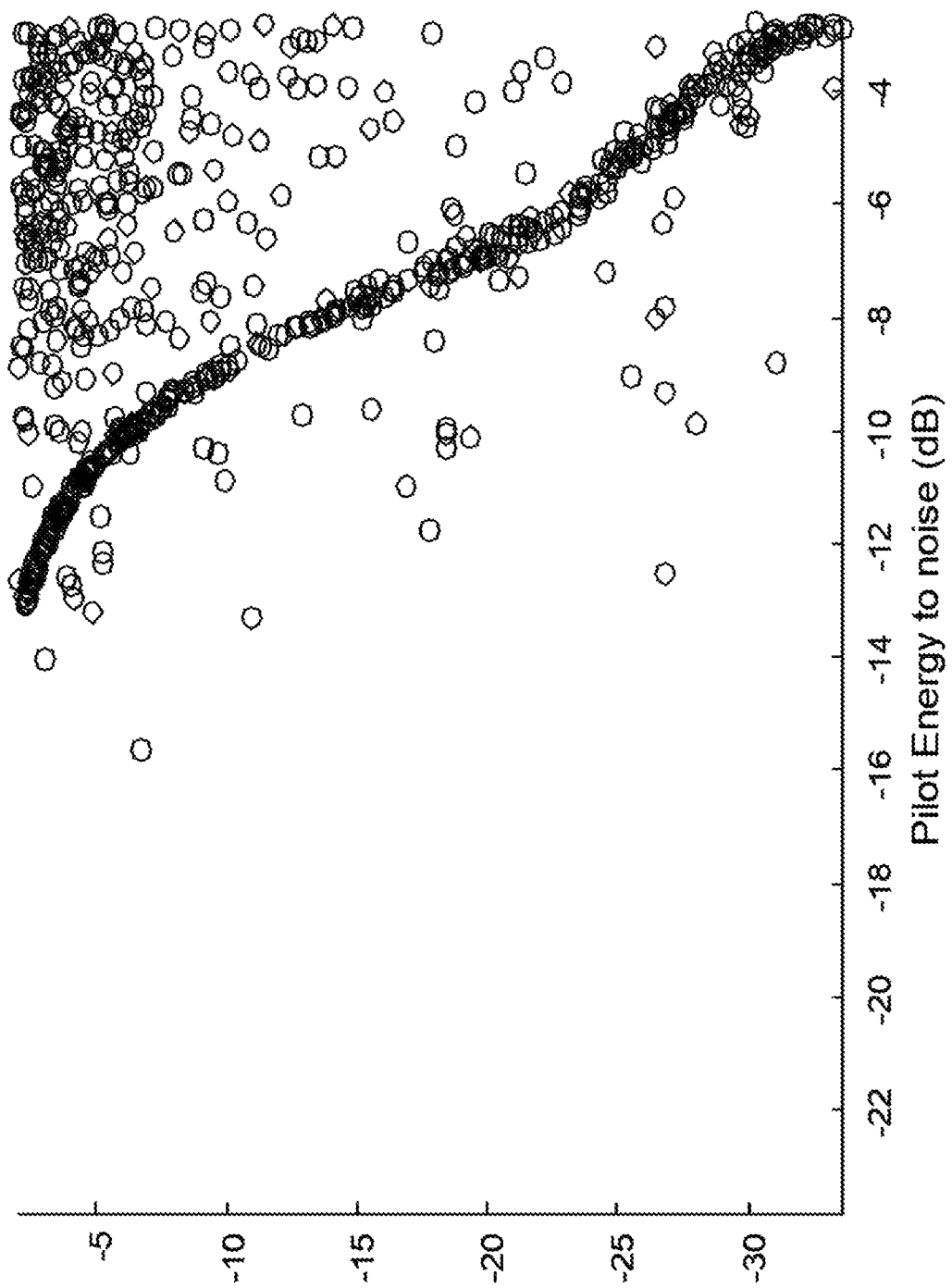
FIG. 4 is a plot of further simulation results, showing MSE of the estimated direction versus lower received pilot energy to noise ratio than in FIG. 3.

For pilot energy to noise ratios less than −5 dB, estimation error does not follow the same trend as shown in FIG. 3. FIG. 4 is a plot of further simulation results, showing MSE of the estimated direction in dB versus lower received pilot energy to noise ratio than in FIG. 3.

Beam squint, as referenced above, is a phenomenon associated with the large bandwidth available at the THz band. With such large bandwidth, transmitted symbols have very short periods that are comparable to the differences in the transmission/reception times at different antennas in MIMO systems, as shown in FIG. 2. This behavior is different from behavior in microwave transmission where the transmission from or reception at different antennas is assumed to occur simultaneously. Consequently, the received signals at different antenna elements suffer from ISI due to beam squint and by deploying multi-carrier techniques, the signals at different subcarriers appear to be transmitted from different directions.

Although beam squint leads to ISI and degrades performance, by affecting antenna array gain for example, beam squint can be used to estimate AoA. Specifically, delay between adjacent antenna elements depends on the inter-antenna element spacing and AoA, and therefore AoA can be estimated once the delay is determined. Delay can be obtained from the performance degradation or the level of ISI that stems from beam squint.

Embodiments related to beam squint will be further described with reference again to FIG. 2 and the disconnected array of subarrays that includes two ULAs 210, 220, each connected to one RF chain (not shown). Beam squint embodiments are further extendable to other array configurations. As in the foregoing example that is described with reference to FIG. 2, both antenna arrays utilize the same beam pattern and beam sweeping is performed. Although the above example refers to ψ as the AoA, the following further example refers to a far field signal arriving at the ULAs 210, 220 with a direction φ as the inclination angle. As noted above, $$\psi = \frac{\pi}{2} - \phi.$$

Therefore, features disclosed with reference to φ may also or instead be applicable to Ii, and vice versa. Note that the same estimation procedure holds for the AoA of each path l. Hence, for simplicity, the subscript of the path number is not included in notation for the AoA. Furthermore, a similar procedure holds for the AoD as shown below by way of example.

With beam squint, the time delay (τ) between adjacent antennas depends on φ and equals $\tau_d$=d·cos(φ)/c. To determine the delay, in some embodiments an auto correlation function of ML PN sequences and the ratio of the SNR or Received Signal Strength Indicator (RSSI) at different RF chains are utilized.

Let the pilot sequence X be an ML PN sequence, of length $N_c$ and chip duration $T_c$. The auto correlation function of the this sequence is periodic as shown in FIG. 5 and is given as follows for one period:

$$\rho_x = \begin{cases} 1 - \eta|\tau_d|, & |\tau_d| \le T\_c \\ \frac{1}{N_c}, & \text{otherwise} \end{cases}, \eta = \frac{N_c + 1}{N_c T_c}$$

Figure 5:
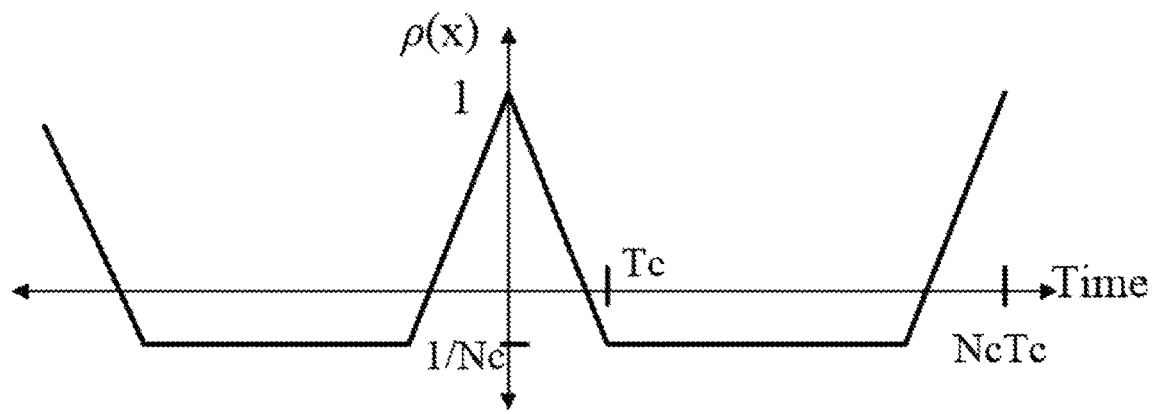
FIG. 5 is a plot illustrating an auto correlation function of a Maximum Length (ML) Pseudo-Noise (PN) sequence.

By focusing on one chip period ($T_c$), it is clear from FIG. 5 and the above expression that the time delay can be obtained from the value of the auto correlation function.

However, there are two main differences when considering the auto correlation function in MIMO systems.

First, the received signal comprises multiple delayed versions of a pilot sequence. Therefore, the cross correlation function is obtained from convolution of the pilot sequence with multiple delayed versions affected by the channel coefficient. The cross correlation ($<Y_1(t),X(t)>$) of the received signal at RF chain 1 ($Y_1$), with the pilot sequence (X(t)) is reduced compared to that without beam squint. An expression for the cross correlation $P_t$ is given above.

Second, the maximum value of the auto correlation function, shown as a value of 1 in FIG. 5, may be unknown unless the receiver already knows the delay and can compensate for it. Therefore, a relative comparison between the cross correlation at different RF chains can help estimate the delay and hence, AoA. Similar to $\rho_1$ but with a shift of M', the cross-correlation of the pilot sequence with $Y_2$ is given as follows, where both RF chains have the same beamformer:

$$\rho_2 = <Y_2(t), X(t)> \cong h_l \sqrt{E_x} \sum_{m=0}^{(M'-1)} w_m e^{-j2\pi(m+M')\tau_d f_c}(1 - \eta|(m+M')\tau_d|)$$

Then, the AoA $\phi$ in this example can be estimated from the ratio of SNR2/SNR1=$|\rho_2|^2/|\rho_1|^2$, as noted above for p. Considering a Discrete Fourier Transform (DFT) analog beamformer where $$w_m = \left(\frac{1}{\sqrt{M'}}\right) e^{j2\pi m \psi}$$

as an example but noting that other beamformers are possible, $$|\rho_1|^2 = \frac{\|h_l\|^2 E_x}{M'}$$

$$\left(M' - 2\eta\tau_d\mu_0 + \eta^2\tau_d^2\mu_1 + 2(1 - \eta\tau_d(M'-1))\sum_{m=1}^{M'-1}(M'-m)\cos(2\pi m v) + 2\eta^2\tau_d^2\sum_{m=1}^{M'-2}\mu_2\cos(2\pi m v)\right);$$

$$|\rho_2|^2 = \frac{\|h_l\|^2 E_x}{M'}\left(M' - 2\eta\tau_d(\mu_0 + M'^2) + \eta^2\tau_d^2(\mu_1 + 2M'\mu_0 + M'^3) + \right.$$

$$2(1 - 2M'\eta\tau_d + M'^2\eta^2\tau_d^2 - (\eta\tau_d - M'\eta^2\tau_d^2)(M'-1))$$

$$\left.\sum_{m=1}^{M'-1}(M'-m)\cos(2\pi m v) + 2\eta^2\tau_d^2\sum_{m=1}^{M'-2}\mu_2\cos(2\pi m v)\right);$$

$$v = \psi - \tau_d f_c, \mu_0 = \frac{(M'-1)M'}{2};$$

$$\mu_1 = \frac{(M'-1)M'(2M'-1)}{6};$$

$$\mu_2 = \frac{(M'-1-m)(M'-m)(2M'-1+m)}{6}.$$

The above formulas are obtained after some mathematical manipulation for $|\rho_1|^2 = \rho_1\rho_1^H$, and with the help of the following identities:

$$\left|\sum_{i=1}^N \delta_i e^{j\zeta_i}\right|^2 = \sum_{i=1}^N \delta_i + 2\sum_{i=1}^N \sum_{k=i+1}^N \delta_i \delta_k \cos(\zeta_i - \zeta_k)$$

$$\sum_{k=1}^n k = \frac{n(n+1)}{2}, \sum_{k=1}^n k^2 = \frac{n(n+1)(2n+1)}{6}, \sum_{k=1}^n k^3 = \frac{n^2(n+1)^2}{4}$$

Figure 6:
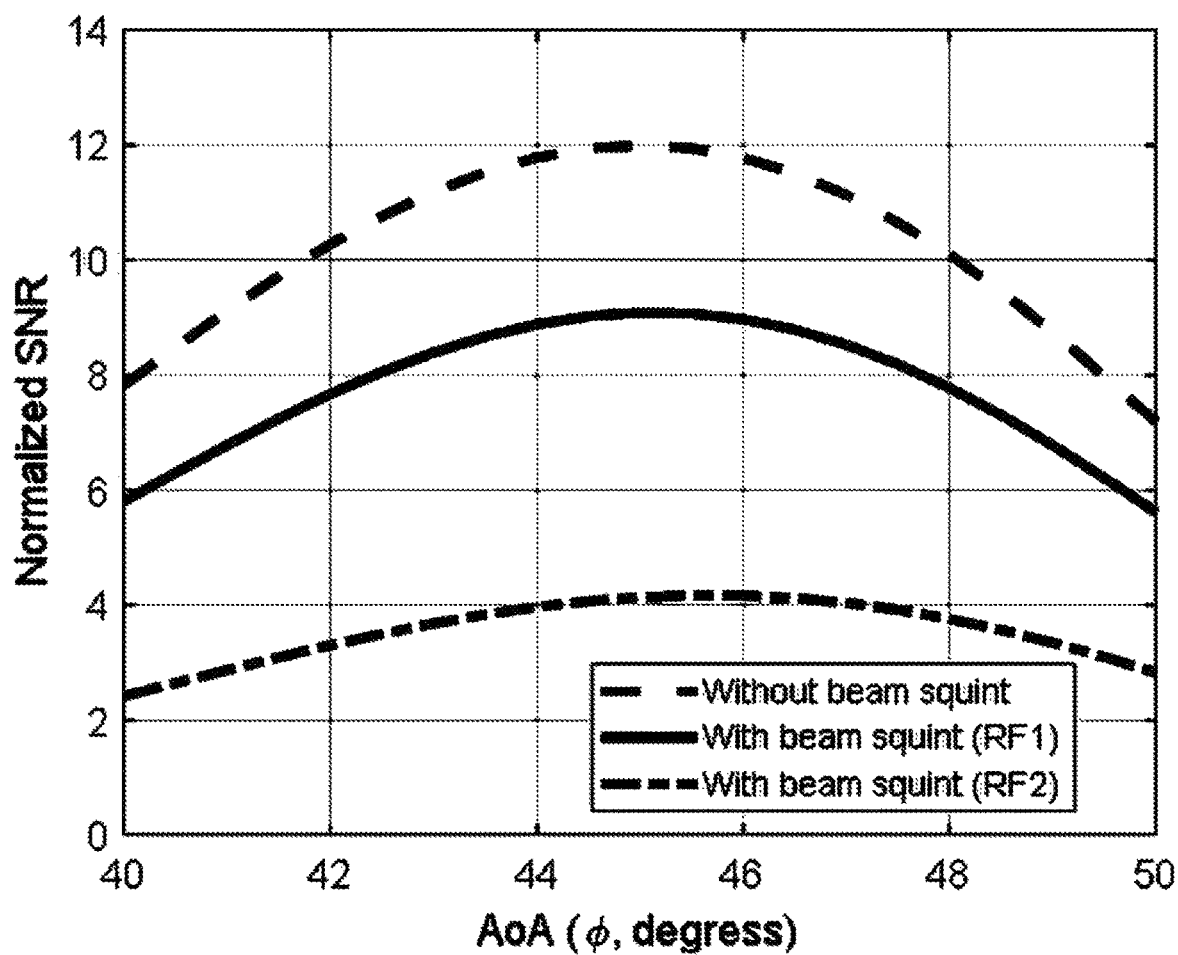
FIG. 6 is a plot illustrating simulation results in the form of normalized Signal to Noise Ratios (SNRs) versus AoA, with and without a beam squint effect.
Figure 7:
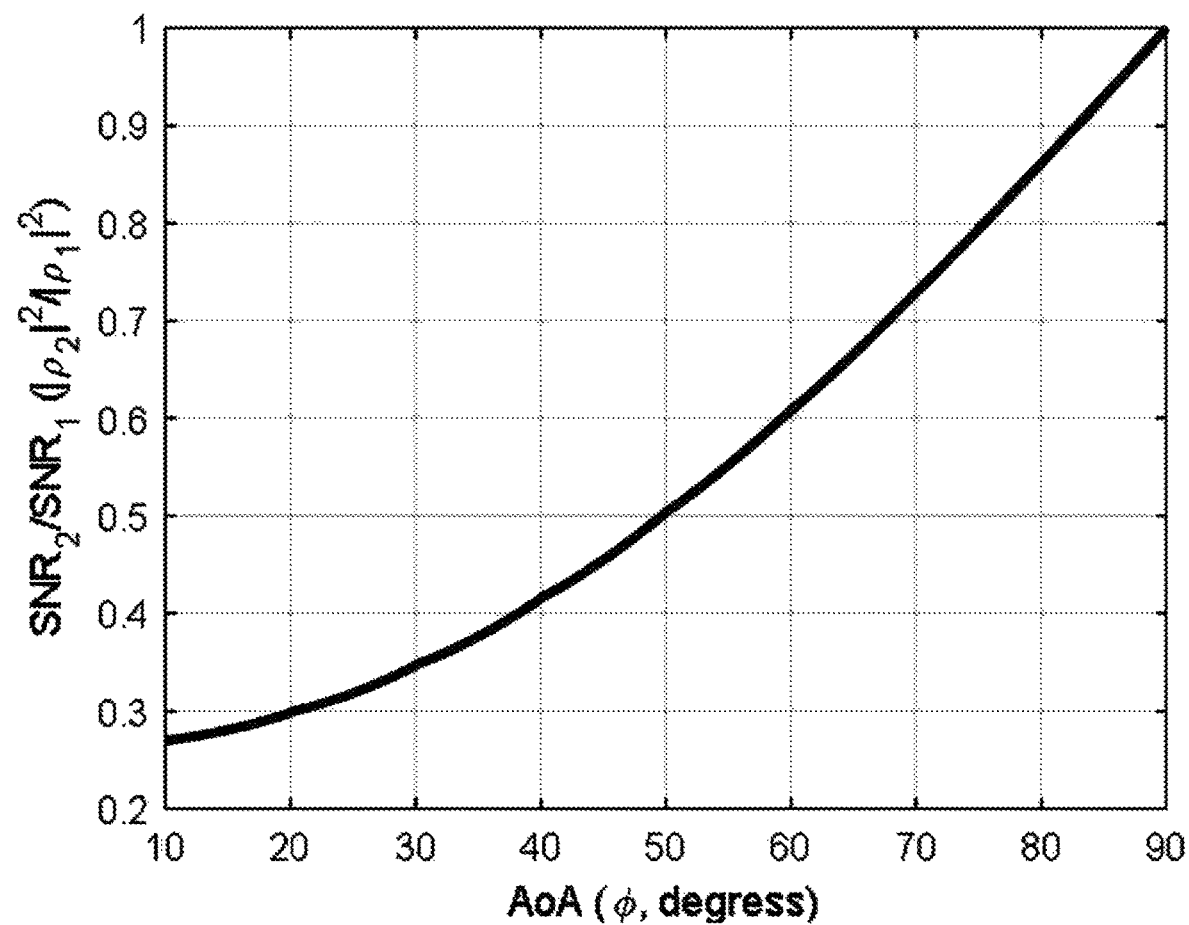
FIG. 7 is a plot illustrating simulation results in the form of a ratio of normalized SNRs versus AoA.

FIG. 6 is a plot illustrating simulation results in the form of normalized SNRs versus AoA, in this example inclination AoA, with and without a beam squint effect, for a two RF chain example, and FIG. 7 is a plot illustrating simulation results in the form of a ratio of normalized SNRs versus inclination AoA, with 12 antennas at each of the two RF chains. Normalized SNR as plotted in FIGS. 6 and 7 may be expressed as $|\rho|^2/(\|h_l\|^2 E_x/N_0)$. It should be noted that if RSSI is plotted, then $|\rho|^2/(\|h_l\|^2 E_x)$ may be used.

As expected, higher gain is obtained without beam squint, but this cannot be achieved unless the AoA is already known and delay elements are inserted at each antenna to align their received signals. To estimate AoA, the gains at RF1 and RF2 can be used. In the example shown in FIG. 2, RF1 has higher gain than RF2 because the signals at RF2 antennas suffer from longer delays. The ratio of $|\rho_2|^2/|\rho_1|^2$ is different at each AoA as shown in FIG. 7, which clearly shows that $|\rho_2|^2/|\rho_1|^2=1$ at $\phi=\pi/2$. This is expected because all antennas simultaneously receive the signal that is coming from the boresight at this inclination angle. However, as $\phi$ decreases, different antennas start receiving the signal with longer delay and lower correlation (gain).

The examples provided above with reference to FIG. 2 relate to linear arrays. It should be appreciated, however, that similar analyses can be applied to 2D antenna arrays or any other antenna structure. Consider a 2D setting similar to that in FIGS. 1 and 2, but with multiple Tx and Rx antenna panels each including 4 subarrays of 36 antennas. In the two-ULA model of FIG. 2, timing delay in effect starts from the top antenna of the top ULA 210. For a 2D array, timing delay is considered to start from the middle of the top left subarray at both the transmitter and the receiver in the further example described below.

At both the transmitter and receiver, let 1, 2, 3 and 4 represent the top-left, top-right, bottom-left, and bottom-right subarrays, respectively, such as 102, 104, 108, 106, respectively, in FIG. 1. Moreover, denote $\rho_{ij}$ as the signal received by the ith receive subarray from the jth transmit subarray. Then, at the receive side (AoA), by taking the ratio $|\rho_{21}|^2/|\rho_{11}|^2$, information can be obtained about the inclination angle $\phi_r$ as the subarrays are traversed horizontally. Nevertheless, information may also be obtained about the $\zeta_r$ values as antennas within the subarrays are traversed vertically. Similarly, $|\rho_{31}|^2/|\rho_{11}|^2$ includes information about both $\phi_r$ and $\zeta_r$. Hence, each pair of $|\rho_{21}|^2/|\rho_{11}|^2$ and $|\rho_{31}|^2/|\rho_{11}|^2$ helps determine $\phi_r$ and $\zeta_r$. Similarly, for the transmit side (AoD), each pair of $|\rho_{12}|^2/|\rho_{11}|^2$ and $|\rho_{13}|^2/|\rho_{11}|^2$ helps determine $\phi_t$ and $\zeta_t$.

For the performance measurement of AoA estimation based on beam squint, its MSE can be expressed as follows:

$$MSE(\phi) \cong$$

$$\frac{8}{G_T(|\rho_1|^2/N_0)\cdot\sin^2(\phi)}\left[\frac{|\rho_2|^2}{|\rho_1|^2} + \left(\frac{|\rho_2|^2}{|\rho_1|^2}\right)^2\right]\left(\frac{1}{\partial(|\rho_2|^2/|\rho_1|^2)/\partial(\tau_d f_c)}\right)^2$$

where $G_T$ is the transmit gain. Note that the receiver gain ($G_R$) is implicitly included in $|\rho_1|^2$. Moreover, note that $|\rho_1|^2/N_0 \propto \|h_l\|^2 E_x/N_0$. Proof of this formula is given as follows:

First, considering the noise term where $\rho_1' = \rho_1 + z_1$ ($\rho_2' = \rho_2 + z_2$), MSE ($\phi$) is defined as follows:

$$MSE(\phi) \cong \frac{1}{G_T} E\left[\left(\frac{|\rho_2'|^2}{|\rho_1'|^2} - \frac{|\rho_2|^2}{|\rho_1|^2}\right)^2\right]\left(\frac{1}{\partial(|\rho_2|^2/|\rho_1|^2)/\partial \tau}\right)^2 \left(\frac{1}{\partial \tau_d/\partial \phi}\right)^2$$

The last two terms on the right-hand side of this formula can be obtained considering their definitions above. Hence, with inter-antenna distance $d=0.5\lambda$, $\partial \phi/\partial \tau_d = 0.5 f_c \sin \phi$. Note that while $\partial \phi/\partial \tau \propto f_c$, $\partial \tau_d/\partial(|\rho_2|^2/|\rho_1|^2) \propto \partial (|\rho_2|^2/|\rho_1|^2)\partial(\tau_d f_c)$. Hence, $f_c$ can be removed and $\partial(|\rho_2|^2/|\rho_1|^2)\partial \tau_d$ can be replaced by $\partial(|\rho_2|^2/|\rho_1|^2)/\partial(\tau_d f_c)$. Next, an approximation for the first term on the right-hand side can be derived.

To derive the first term on the right-in the formula above, a similar approximation of the MSE for the phase difference method can be used $$\rho_1'\rho_1'^H = |\rho_1|^2 + \rho_1 z_1^H + \rho_1^H z_1 + z_1 z_1^H$$

where the last term can be ignored at high SNR. Moreover, because the third terms is the conjugate of the second term, $$\rho_1'\rho_1'^H \approx |\rho_1|^2 + 2\Re[\rho_1 z_1^H]$$

where the approximation follows from ignoring the last term at high SNR. A similar formula can be obtained for $\rho_2'\rho_2'^H$.

Now, considering the approximations of $\rho_1'\rho_1'^H$ and $\rho_2'\rho_2'^H$, the expectation term is given as follows:

$$E\left[\left(\frac{|\rho_2'|^2}{|\rho_1'|^2} - \frac{|\rho_2|^2}{|\rho_1|^2}\right)^2\right] \overset{(a)}{\approx} E\left[\left(\frac{|\rho_2|^2 + 2\Re[\rho_2 z_2^H]}{|\rho_1|^2 + 2\Re[\rho_1 z_1^H]} - \frac{|\rho_2|^2}{|\rho_1|^2}\right)^2\right] =$$

$$E\left[\left(\frac{2\Re[\rho_2 z_2^H]|\rho_1|^2 - 2\Re[\rho_1 z_1^H]|\rho_2|^2}{|\rho_1|^4 + 2\Re[\rho_1 z_1^H]|\rho_1|^2}\right)^2\right] \overset{(b)}{\approx}$$

$$E\left[\left(\frac{2\Re[\rho_2 z_2^H]|\rho_1|^2 - 2\Re[\rho_1 z_1^H]|\rho_2|^2}{|\rho_1|^4}\right)^2\right] =$$

$$E\left[\left(\frac{2\Re[\rho_2 z_2^H]}{|\rho_1|^2} - \frac{2\Re[\rho_1 z_1^H]|\rho_2|^2}{|\rho_1|^4}\right)^2\right] =$$

$$E\left[\left(\frac{2\Re[\rho_2 z_2^H]}{|\rho_1|^2}\right)^2\right] + E\left[\left(\frac{2\Re[\rho_1 z_1^H]|\rho_2|^2}{|\rho_1|^4}\right)^2\right] -$$

$$2E\left[\frac{2\Re[\rho_2 z_2^H]}{|\rho_1|^2} \times \frac{2\Re[\rho_1 z_1^H]|\rho_2|^2}{|\rho_1|^4}\right] \overset{(c)}{=} E\left[\left(\frac{2\Re[\rho_2 z_2^H]}{|\rho_1|^2}\right)^2\right] +$$

$$E\left[\left(\frac{2\Re[\rho_1 z_1^H]|\rho_2|^2}{|\rho_1|^4}\right)^2\right] \overset{(d)}{=} \frac{2}{|\rho_1|^2/N_0}\left[\frac{|\rho_2|^2}{|\rho_1|^2} + \left(\frac{|\rho_2|^2}{|\rho_1|^2}\right)^2\right]$$

where the approximation (a) follows from the approximation of $\rho_1'\rho_1'^H$ and $\rho_2'\rho_2'^H$ at high SNR in the previous step; the approximation (b) follows again from the high SNR assumption where $|\rho_1|^2 >> 2\Re[\rho_1 z_1^H]$; (c) follows since the noise has zero mean; and (d) follows as $E[(2\Re[\rho_2 z_2^H])^2] = 4|\rho_2|^2 N_0/2$ and $E[(2\Re[\rho_1 z_1^H])^2] = 4|\rho_1|^2 N_0/2$.

Last, by combining the formulas of $\partial \phi/\partial \tau$ given in the first step and $$E\left[\left(\frac{|\rho_2'|^2}{|\rho_1'|^2} - \frac{|\rho_2|^2}{|\rho_1|^2}\right)^2\right]$$

given in the previous step, MSE($\phi$) is obtained as above. It is clear from the MSE formula that end-fire of a ULA may potentially be a concern. However, this is not expected to be a significant problem considering that there may be multiple antenna locations in communication devices such as UEs or network equipment.

Note that the MSE is smaller with larger $|\rho_1|^2$. Under an assumption that the first antenna in ULA1 is the reference antenna in a linear array deployment for example, higher correlation and hence larger $|\rho_1|^2$ can be obtained when considering the reference antenna as the middle antenna of ULA1. Nevertheless, the analysis and derivations will remain the same.

Figure 8:
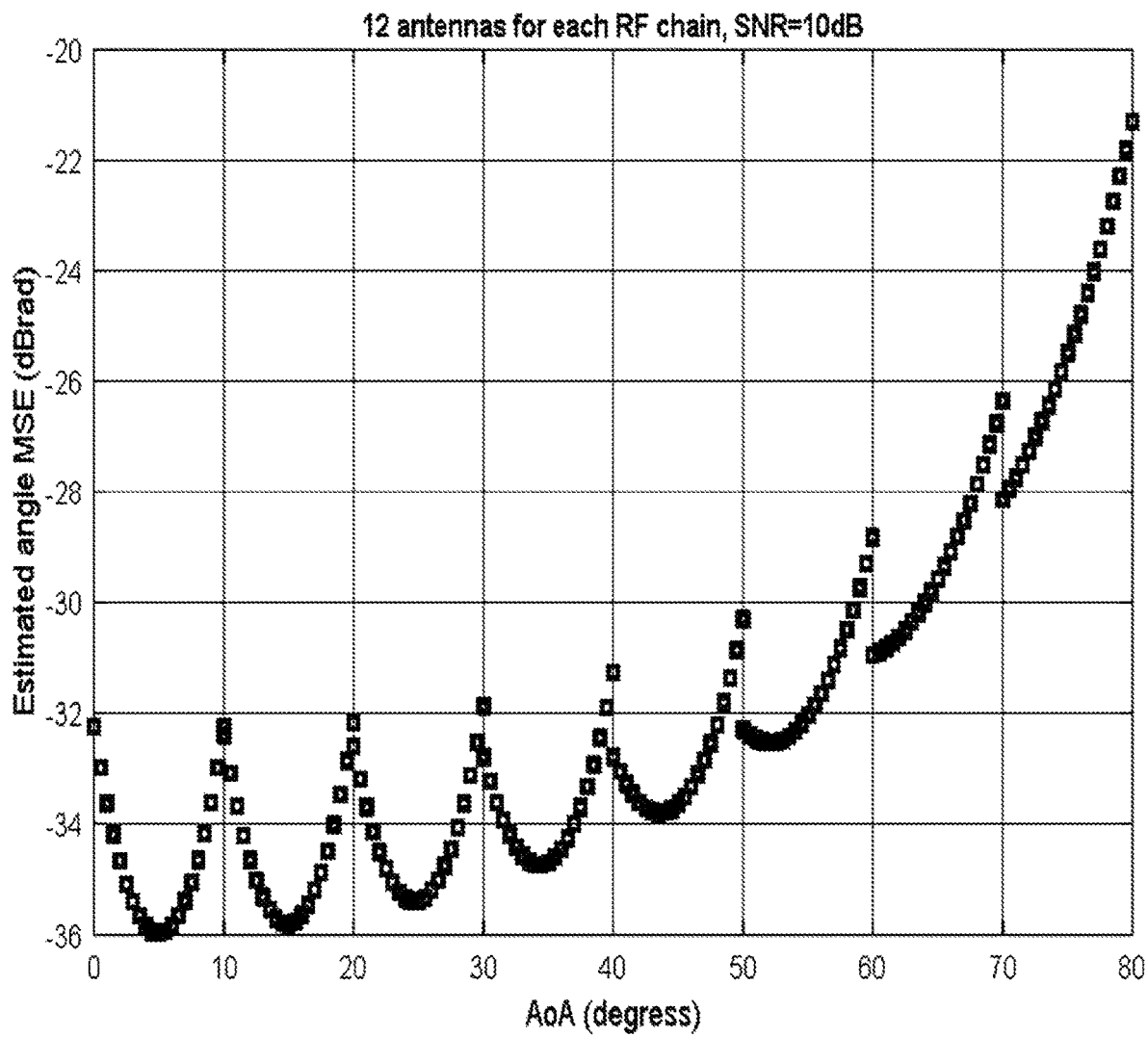
FIG. 8 is a plot illustrating simulation results in the form of estimated angle MSE versus AoA.

FIG. 8 is a plot illustrating simulation results in the form of estimated angle MSE versus AoA, and shows the MSE performance of a proposed method versus $$\psi \left(\text{i.e., } \psi = \frac{\pi}{2} - \phi\right)$$

where each RF chain has 12 antennas and at SNR=10 dB and $G_T$=40. The AoA plotted in FIG. 8 is boresight AoA, which corresponds to (0.5π-inclination AoA) in radians (rad), or (90-inclination AoA) in degrees.

With reference to FIG. 8, an average performance of −30 dB or better is obtained up to ψ=70°. Performance can potentially be improved with more antennas, provided that the phase difference between the first antenna that receives the signal and the last one that receives it is less than one chip period. If the delay exceeds the chip period duration, then the cross correlation with the pilot PN sequence will be very small (1/$N_c$) and unhelpful. Any one or more of several methods can be used to solve such a problem. For example, multiple panels can be used instead of multiple ULAs, where many antenna can be deployed in each panel for estimation of azimuth and elevation angle. Another possible option is to delay the pilot sequence that is correlated with ULA 220 in FIG. 2 for example, such that correlation with received signals at different antennas is still within the chip period duration. By knowing the delay between the PN sequence in ULA 210 and ULA 220 in FIG. 2 for example, the AoA can still be estimated from the ratio of the SNR at RF1 and RF2. The PN sequence may also or instead be modified to any one or more of: a longer chip-duration, a different pulse-shape, and a different correlation function that gives more information over longer duration.

On another note regarding FIG. 8, at the end fire of a ULA where ψ approaches $$\frac{\pi}{2}$$

(i.e., 90 degrees) or φ approaches 0, the MSE becomes high, which is expected from the formula with the denominator term sin(φ)=0. However, as noted above the end-fire issue is not expected to be a significant problem with multiple antennas likely being deployed at different locations at communication devices.

It is also noted from FIG. 8 that the MSE value changes by a few dB within each beam. Consider the MSE at beam centers and edges. A smoother curve for the MSE results may be obtained, for example, by using different analog beamformers with almost constant gain over the beam width.

Various embodiments for beam acquisition are described at least above where the AoA/AoD estimation help determine the receive/transmit beam direction while the MSE calculations help determine the beam width. Signaling to support such embodiments may also be of interest. In some examples, network equipment may generate a beam with a direction determined based on the AoA/AoD and with a beam width determined according to the MSE calculations.

Consider, for example, DL-based measurement. Configuration signaling to configure a UE and network equipment for reference signaling, such as CSI-RS configuration signaling, can be substantially as in New Radio (NR) for pilot allocation, but potentially with some reference signaling patterns or configurations such CSI-RS patterns/configurations. With reference signaling patterns or configurations being signaled to or otherwise available at a receiver of reference signaling, which is a UE in the case of DL-based measurement, embodiments disclosed herein can be applied to determine one or more values or metrics related to AoD without beam refinement or at least with fewer iterations of beam refinement compared to conventional beam sweeping and beam refinement techniques.

For DL-based measurement, AoA is estimated at the UE and is useful at the UE, and no further signaling is necessarily involved in AoA determination in some examples. For AoD estimation involving DL-based measurement, there may be RRC and/or feedback signaling impact. For example, one option involves receiver measurement. In some embodiments, configuration signaling is used to configure the receiver communication device, which is a UE for DL-based measurement, to measure phase difference and/or beam squint power ratio, or a function or metric related to them, and to report back to the transmitter, which is network equipment in the case of DL-based measurement. Such reporting back after measurement involves a feedback mechanism and signaling that are not part of conventional beam sweeping and beam refinement techniques. The configuration signaling is used to configure the UE to perform measurements and report back to the network equipment in this example, and the network equipment then estimates the AoD of the reference signaling that it transmitted to the UE for DL-based measurement, without beam refinement or at least with fewer iterations of beam refinement compared to conventional beam sweeping and beam refinement techniques.

Another possible option for DL-based measurement involves receiver estimation. Antenna structure and parameters of the setup for beam sweeping are signaled or otherwise provided to the UE, and the UE estimates AoD based on received reference signaling and feeds back the AoD estimate to the network equipment. With the antenna structure and parameters being signaled to or otherwise available at the UE in this example, the UE can estimate AoD without beam refinement or at least with fewer iterations of beam refinement compared to conventional beam sweeping and beam refinement techniques. The estimate reporting back to network equipment also involves a feedback mechanism and signaling that are not part of conventional beam sweeping and beam refinement techniques.

Turning to UL-based measurement, configuration signaling to configure a UE and network equipment for UL reference signaling, such as sounding reference signal (S-RS) configuration signaling, can be substantially as in NR for pilot allocation, but potentially with some reference signaling patterns or configurations such S-RS patterns/configurations. With reference signaling patterns or configurations being signaled to or otherwise available at a receiver of reference signaling, which is a network equipment in the case of UL-based measurement, embodiments disclosed herein can be applied to determine one or more values or metrics related to AoD without beam refinement or at least with fewer iterations of beam refinement compared to conventional beam sweeping and beam refinement techniques.

As in the case of DL-based measurement, in UL-based measurement AoA is estimated at and is useful at the receiver of reference signaling, which is network equipment for UL measurement, and no further signaling is necessarily involved in AoA determination.

For AoD estimation involving UL-based measurement, there may be RRC and/or other DL signaling impact. For example, one option involves receiver measurement, in which case configuration signaling is used to configure the receiver communication device, which is network equipment for UL-based measurement, to measure phase difference and/or beam squint power ratio, or a function or metric related to them, and to report back to the transmitter, which is a UE in the case of UL-based measurement. Such reporting back after measurement involves a DL feedback mechanism and signaling that are not part of conventional beam sweeping and beam refinement techniques. The configuration signaling is used in this example to configure the network equipment to perform measurements and report back to the UE, and the UE then uses the information that is reported back by the network equipment to estimate the AoD of the reference signaling that it transmitted to the network equipment for UL-based measurement, without beam refinement or at least with fewer iterations of beam refinement compared to conventional beam sweeping and beam refinement techniques.

Another possible option for UL-based measurement involves receiver estimation. UE antenna structure and parameters of the setup for beam sweeping are signaled or otherwise provided to the network equipment, and the network equipment estimates AoD based on received reference signaling and feeds back the AoD estimate to the UE. Again, with the antenna structure and parameters being signaled to or otherwise available at the receiver, which is network equipment in this example, the network equipment can estimate AoD without beam refinement or at least with fewer iterations of beam refinement compared to conventional beam sweeping and beam refinement techniques. The estimate reporting back to the UE also involves a feedback mechanism and signaling that are not part of conventional beam sweeping and beam refinement techniques.

Illustrative examples of signaling consistent with embodiments disclosed herein are provided below, with reference to FIGS. 9A to 12. Other signaling approaches are possible.

Figure 9A:
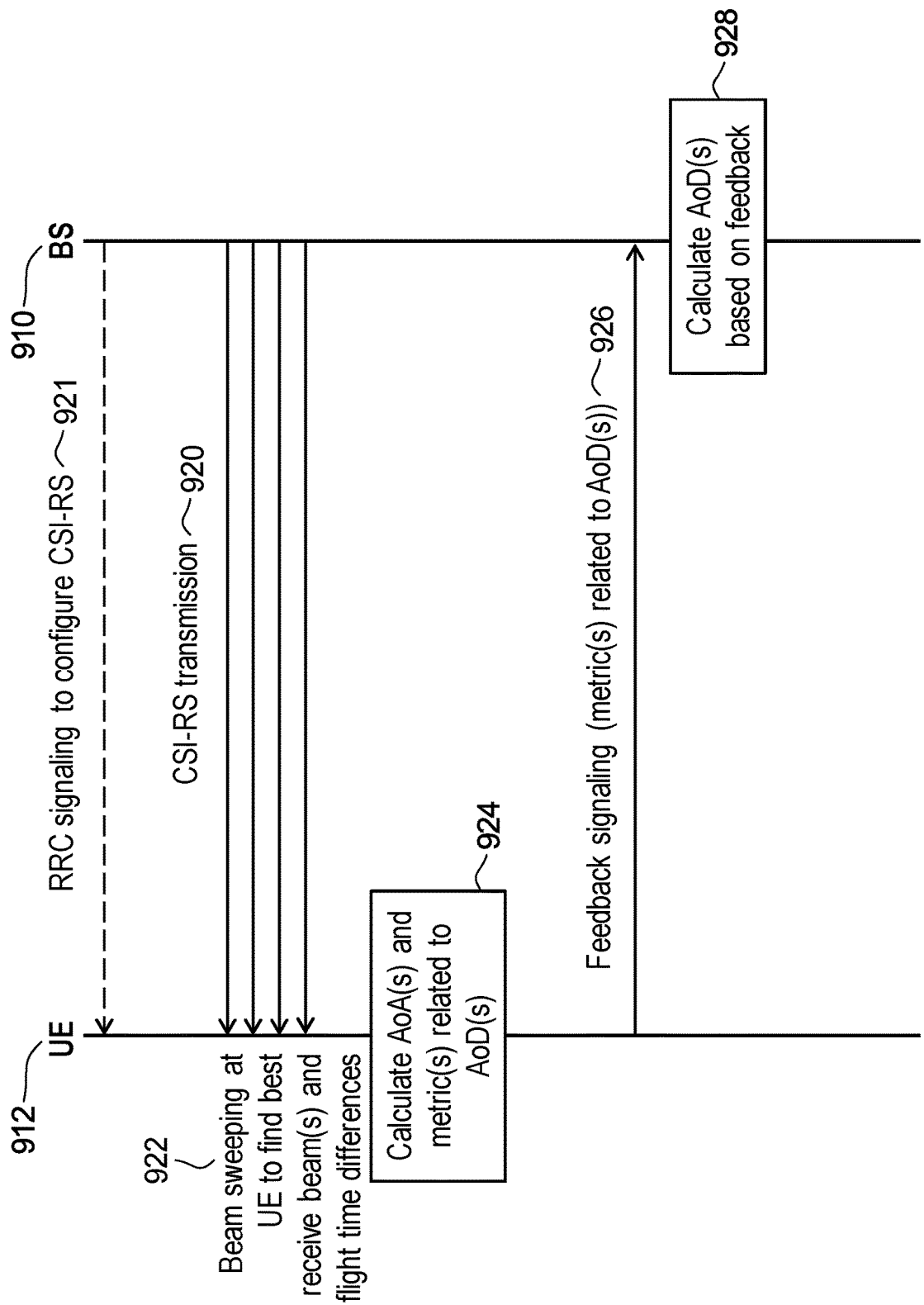
FIG. 9A is a signal flow diagram illustrating signaling in accordance with an embodiment that involves downlink (DL)-based measurement.

FIG. 9A is a signal flow diagram illustrating signaling in accordance with an embodiment that involves DL-based measurement. In FIG. 9A, network equipment that is shown by way of example as a base station (BS) 910 transmits RRC signaling at 921 to configure a UE 910 for reference signaling, such as CSI-RS signaling, which is subsequently transmitted at 920 to the UE by the BS. RRC signaling is an example of configuration signaling and CSI-RS signaling is an example of reference signaling that may be used in some embodiments during beam sweeping. Beam sweeping is performed at the UE 912 to find one or more receive beams and flight time differences in the example shown. More generally, during beam sweeping a receiver of reference signaling, which is the UE 912 receiving CSI-RS signaling 920, determines one or more receive beams that meet one or more beam acquisition criteria, and the best receive beam(s) referenced in FIG. 9A relate to an example of one or more receive beams that satisfy one or more beam acquisition criteria. Beam acquisition criteria may be based on any of various characteristics or properties, such as those described elsewhere herein in the context of beam sweeping and angle estimation. In some embodiments, for example, a beam acquisition criterion is satisfied if reference signaling received via a beam satisfies an SNR or RSSI threshold.

At 924, the UE calculates AoA for one or more paths, and one or more metrics related to AoD for one or more paths, as disclosed by way of example elsewhere herein. The metric(s) related to AoD may include, for example, any one or more of: phase difference, squint power ratio, correlation values, and other AoD-related values disclosed herein. Feedback signaling that is indicative of the metric(s) related to the AoD(s) is transmitted at 926 from the UE 912 to the BS 910. The BS 910 then estimates the one or more AoD(s) at 928 based on the metric(s) provided to the BS by the feedback signaling 926 from the UE.

Figure 9B:
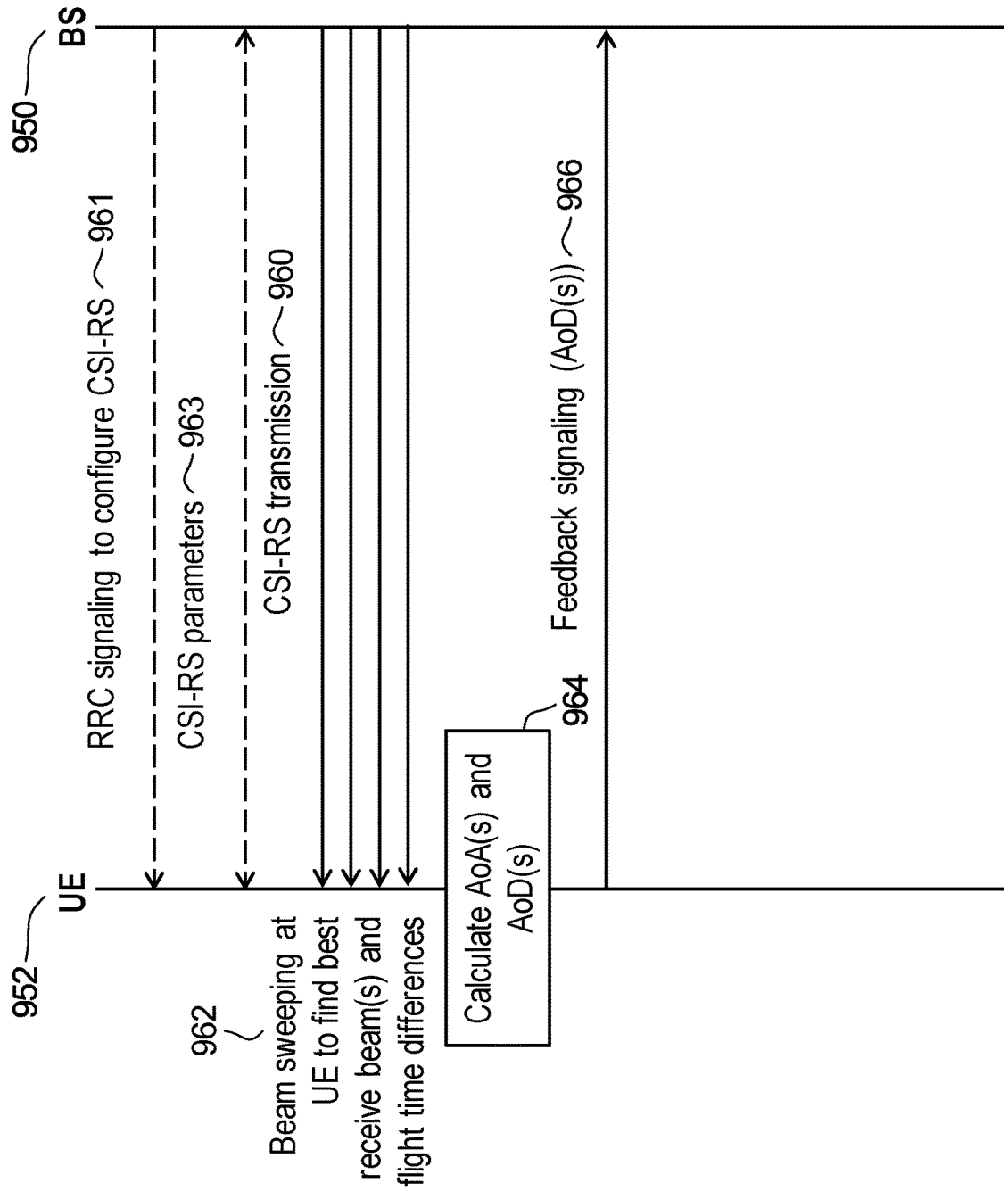
FIG. 9B is a signal flow diagram illustrating signaling in accordance with another embodiment that involves DL-based measurement and estimation.

FIG. 9B is a signal flow diagram illustrating signaling in accordance with another embodiment, which involves DL-based measurement and AoD estimation. As in FIG. 9A, in FIG. 9B a BS 950 transmits RRC signaling at 961 to configure a UE 952 for CSI-RS signaling in the example shown. The BS 950 and the UE 952 also exchange signaling at 963, shown in FIG. 9B as CSI-RS parameters, to enable AoD estimation at the UE. The signaling at 961 in FIG. 9B is shown as a bidirectional arrow to represent possible exchange of multiple messages between the BS 950 and the UE 952 to exchange the CSI-RS parameters. Beam sweeping is performed at the UE 952 to find one or more receive beams and flight time differences in the example shown, and the UE calculates not only AoA for one or more paths but also an estimate of AoD for one or more paths, as disclosed by way of example elsewhere herein. The estimated AoD(s) are fed back to the BS 950 in feedback signaling 966.

Figure 10A:
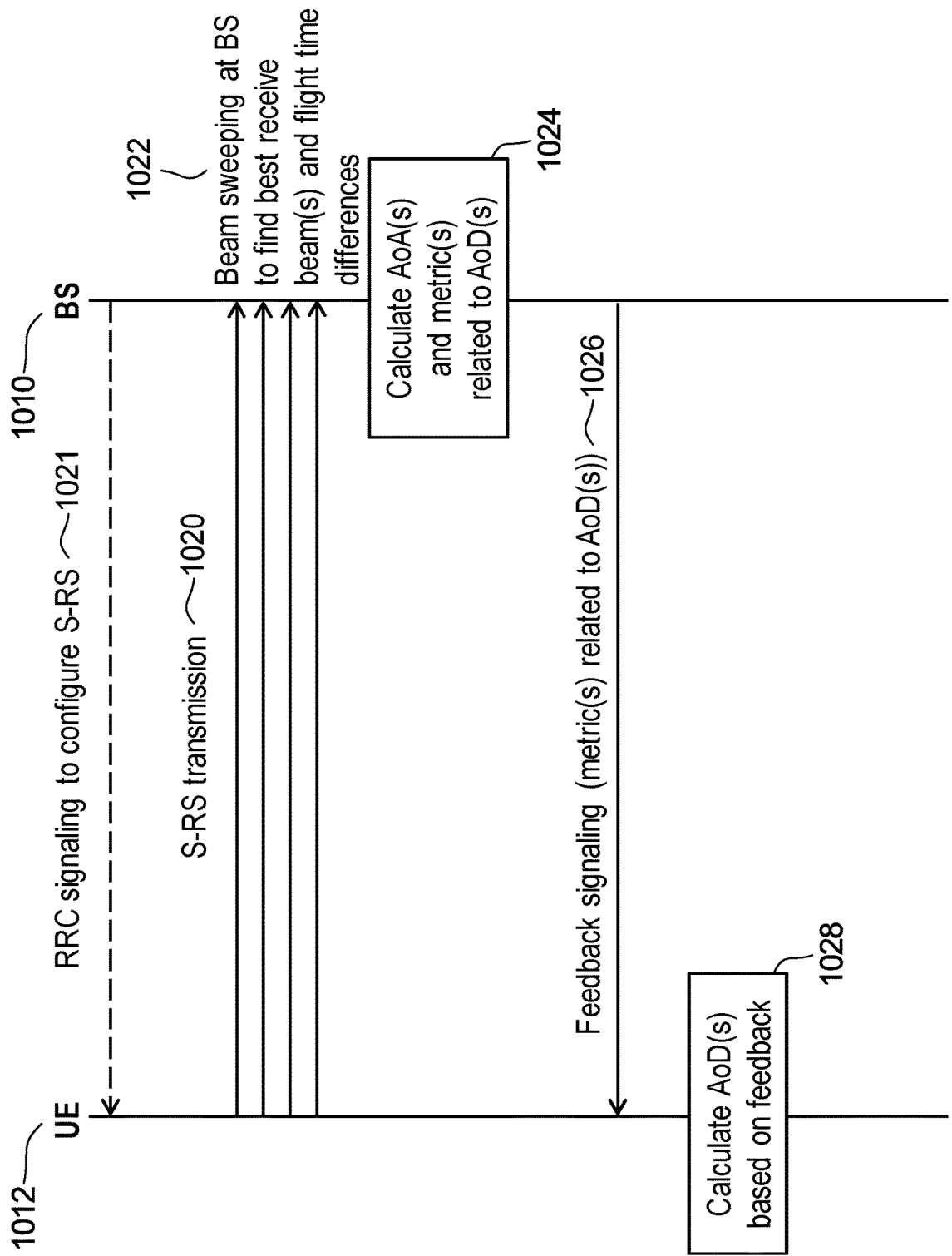
FIG. 10A is a signal flow diagram illustrating signaling in accordance with an embodiment that involves uplink (UL)-based measurement.

FIG. 10A is a signal flow diagram illustrating signaling in accordance with an embodiment that involves UL-based measurement. The example shown in FIG. 10A is similar to the example shown in FIG. 9A, except that the RRC signaling at 1021 configures the UE 1012 for S-RS signaling, the reference signaling at 1020 is S-RS signaling, the UE 1012 transmits the reference signaling to a BS 1010, the BS calculates AoA for one or more paths and calculates one or more metrics related to AoD for one or more paths at 1024 and feeds back the metric(s) to the UE in feedback signaling 1026, and the UE calculates the AoD(s) at 1028 based on the feedback from the BS. In respect of reference signaling, the UE 1012 is the transmitter and the BS 1010 is the receiver in FIG. 10A, whereas the BS 910 is the transmitter and the UE 912 is the receiver in FIG. 9A.

Figure 10B:
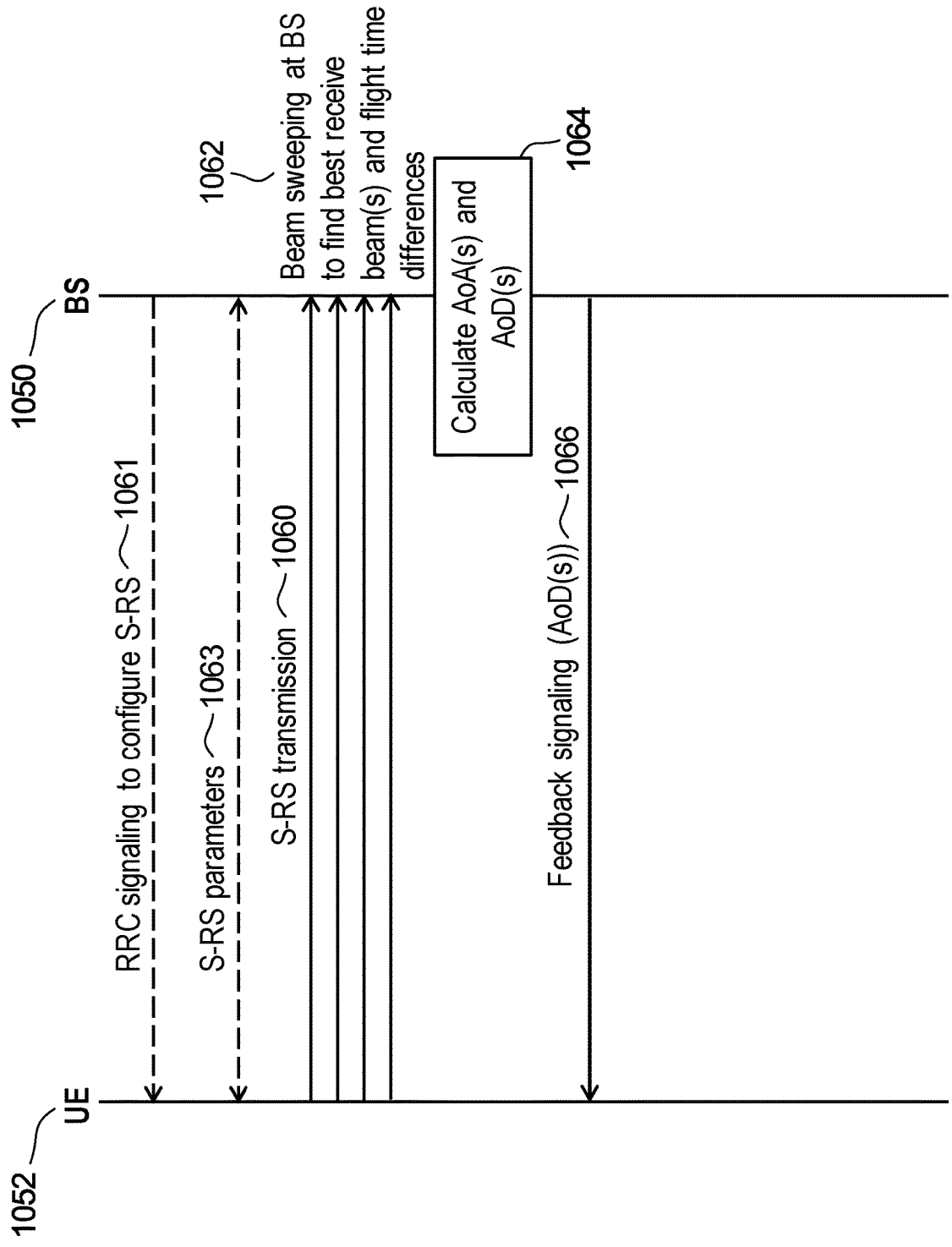
FIG. 10B is a signal flow diagram illustrating signaling in accordance with a further embodiment that involves UL-based measurement and estimation.

Similarly, in the signal flow diagram of FIG. 10B illustrating signaling in accordance with a further embodiment that involves UL-based measurement and estimation, reference signal transmitter and receiver roles of the UE and the BS are reversed relative to FIG. 9B. A BS 1050 transmits RRC signaling to a UE 1052 at 1061 to configure the UE for reference signaling in the form of S-RS signaling in the example shown, and one or more S-RS parameters are exchanged with the BS at 1063. The parameter(s) enable the BS 1050 to determine AoD for one or more paths based on the S-RS signaling 1060 received from the UE 1052, and the BS feeds back the estimated AoD(s) to the UE in feedback signaling at 1066.

DL and UL examples are provided above, but it should be noted that the techniques disclosed herein may be applied to other scenarios, including device-to-device (D2D) communications such as sidelink (SL) communications in which the transmitter and the receiver of reference signaling are UEs. SL communications are described below as an example of D2D communications.

Figure 11A:
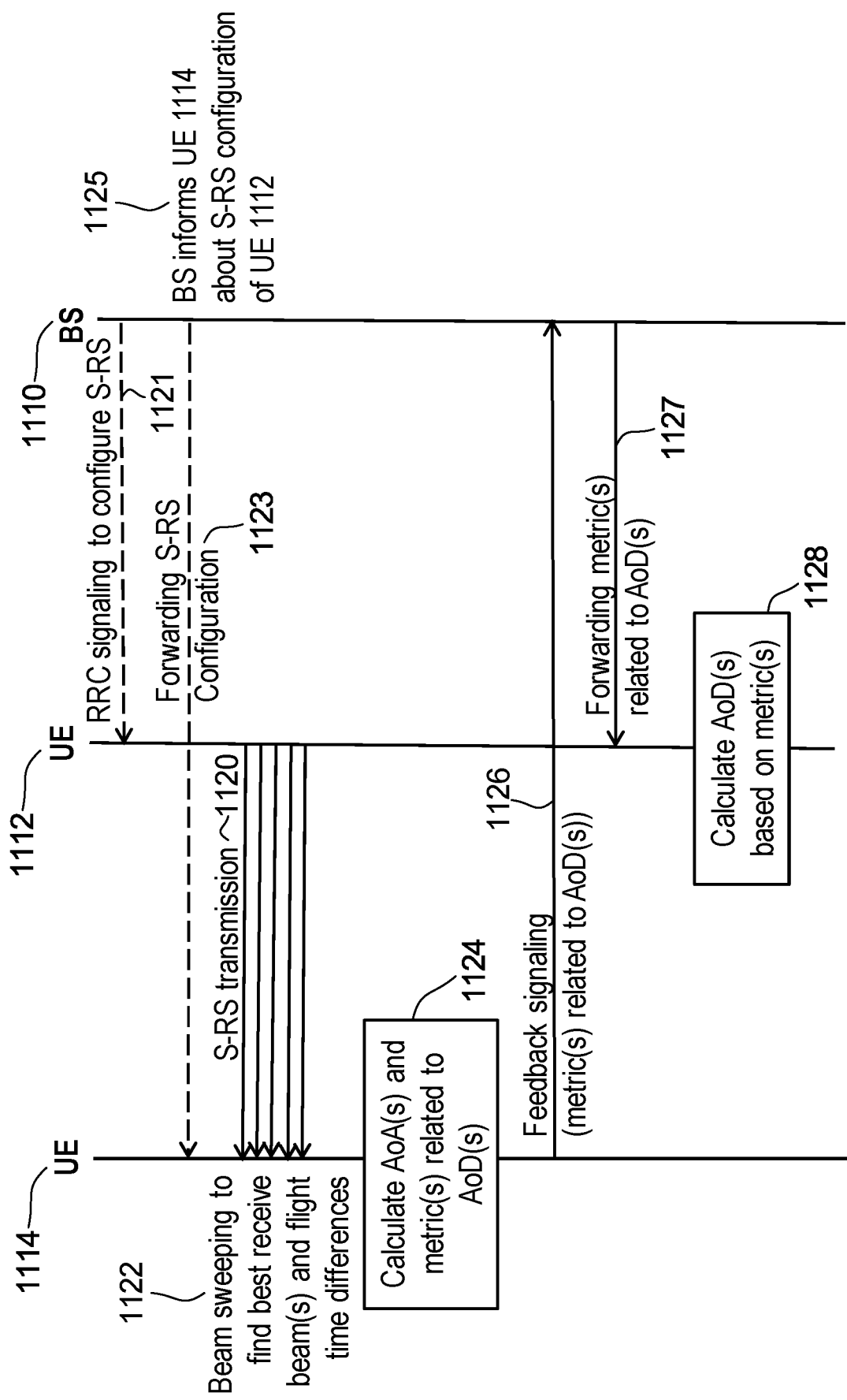
FIG. 11A is a signal flow diagram illustrating signaling in accordance with an embodiment that involves sidelink (SL)-based measurement and estimation.

FIG. 11A is a signal flow diagram illustrating signaling in accordance with an embodiment that involves SL-based measurement and estimation. SL-based embodiments may be substantially similar to UL and DL embodiments, but potentially with involvement of network equipment such as a BS 1110 in FIG. 11A, in addition to the beam sweeping transmitter and receiver, which are UEs 1112 and 1114, respectively, in the example shown in FIG. 11A.

The BS 1110 configures the UE 1112 for S-RS signaling by transmitting RRC signaling to the UE 1112 at 1121. In the example shown, signaling 1123 that is indicative of the S-RS configuration of the UE 1112 is also forwarded to the UE 1114 by the BS 1110 so that the UE 1114 is able to perform beam sweeping to find one or more receive directions and flight time differences at 1122. In other embodiments, such signaling may be forwarded by the UE 1112 to the UE 1114. The UE 1114 calculates AoA for one or more paths and calculates one or more metrics related to AoD for one or more paths at 1124 based on the S-RS signaling received from the UE 1112 at 1120, and feeds back the metric(s) to the BS 1110 in feedback signaling 1126 in the example shown. The BS 1110 then forwards the metric(s) in signaling 1127 to the UE 1112, which calculates the AoD(s) at 1128 based on the metric(s). In another embodiment, the UE 1114 feeds back the metric(s) directly to the UE 1112, via another band such as a low frequency band for example.

Figure 11B:
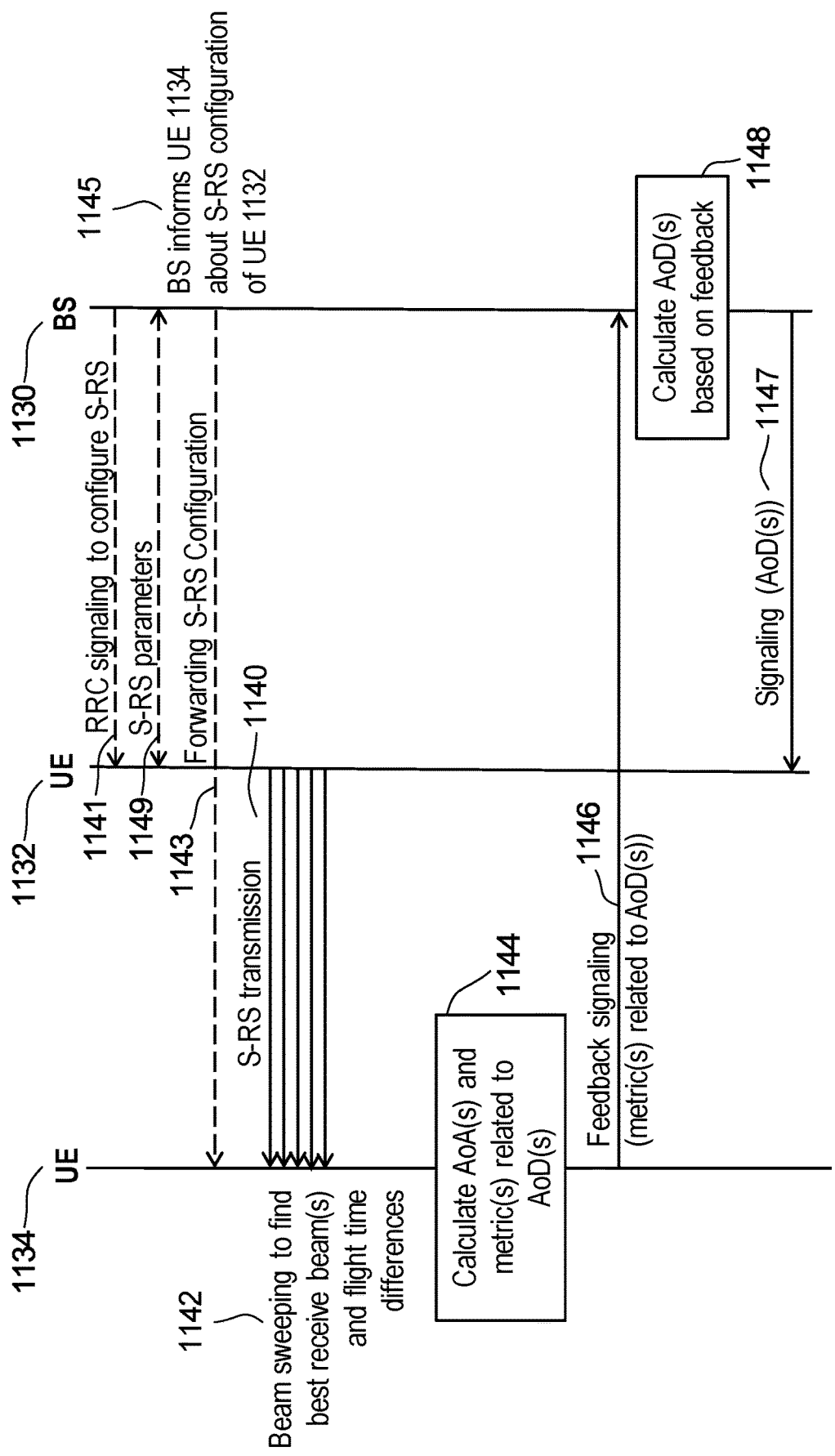
FIG. 11B is a signal flow diagram illustrating signaling in accordance with an embodiment that involves SL-based measurement.

FIG. 11B is a signal flow diagram illustrating signaling in accordance with an embodiment that involves SL-based measurement. The example in FIG. 11B is substantially the same as the example in FIG. 11A, except that a BS 1130 calculates an AoD estimate for one or more paths at 1148 based on feedback signaling 1146 from a UE 1134 and signals the AoD(s) to a UE 1132 in signaling 1147. The exchange of one or more S-RS parameters between the UE 1132 and the BS 1130 at 1149 enables AoD estimation by the BS. Although this exchange is shown in FIG. 11B as taking place before the S-RS configuration of the UE 1132 is forwarded to the UE 1134 at 1145 in signaling 1143, the parameter exchange at 1149 and the forwarding of the S-RS configuration of the UE 1132 to the UE 1134 at 1145 may be performed in the reverse order in other embodiments. Other variations, such as the UE 1134 directly feeding back the metric(s) to the UE 1132 and the UE 1132 forwarding the metric(s) to the BS 1130, are also possible. The S-RS signaling at 1140, the beam sweeping at 1142, the calculation of AoA(s) and metric(s) at 1144, and the feedback signaling at 1146 may be the same or substantially the same as 1120, 1122, 1124, 1126, respectively, in FIG. 11A.

Figure 11C:
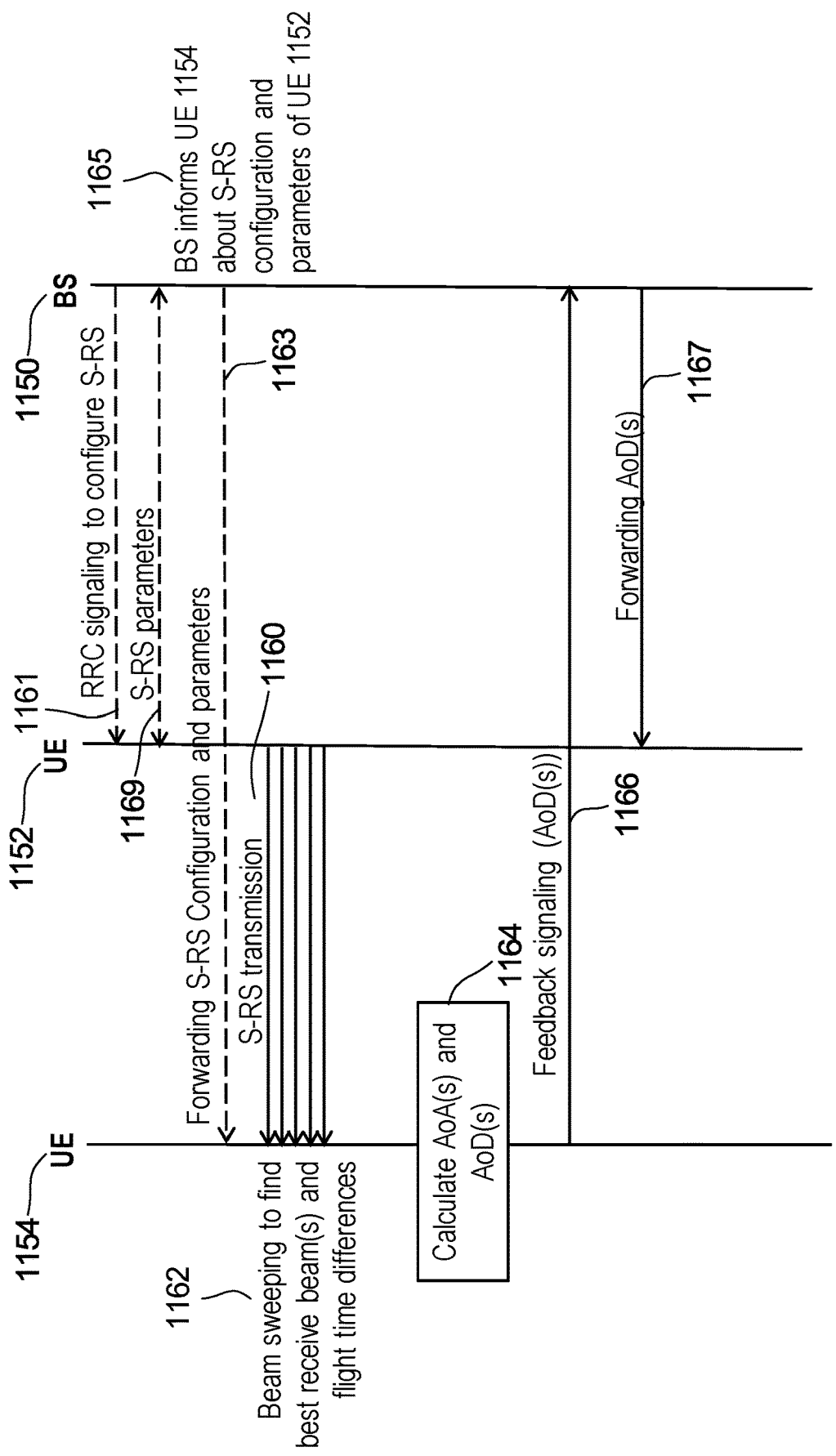
FIG. 11C is a signal flow diagram illustrating signaling in accordance with another embodiment that involves SL-based measurement and estimation.

FIG. 11C is a signal flow diagram illustrating signaling in accordance with another embodiment that involves SL-based measurement and estimation. In FIG. 11A AoD estimation is at the UE 1112 that transmits reference signaling at 1120, in FIG. 11B AoD estimation is at the BS 1130, and in FIG. 11C AoD estimation is at a UE 1154 that receives reference signaling from another UE 1152 at 1160. A BS 1150 configures the UE 1152 for S-RS signaling through RRC signaling at 1161 and exchanges one or more S-RS parameters with the UE 1152 at 1169. One or more S-RS parameters of the UE 1152, in addition to the S-RS configuration of the UE 1152, are forwarded to the UE 1154 by the BS 1150 at 1165, in signaling 1163 in the example shown. The UE 1154 performs beam sweeping at 1162, and the one or more parameters signaled to the UE 1154 at 1165 enable the UE 1154 to calculate AoA and AoD estimates at 1164 for one or more paths. The estimated AoD(s) are then fed back to the BS 1150 by the UE 1154 in feedback signaling 1166, and the estimated AoD(s) are forwarded to the UE 1152 by the BS in signaling 1167 in the example shown.

In other embodiments, the UE 1152 S-RS configuration and/or beam sweeping parameter(s) may be forwarded to the UE 1154 by the UE 1152 instead of by the BS 1150. Another possible variation involves feedback of the estimated AoD(s) directly from the UE 1154 to the UE 1152. Other variations are also possible.

Figure 11D:
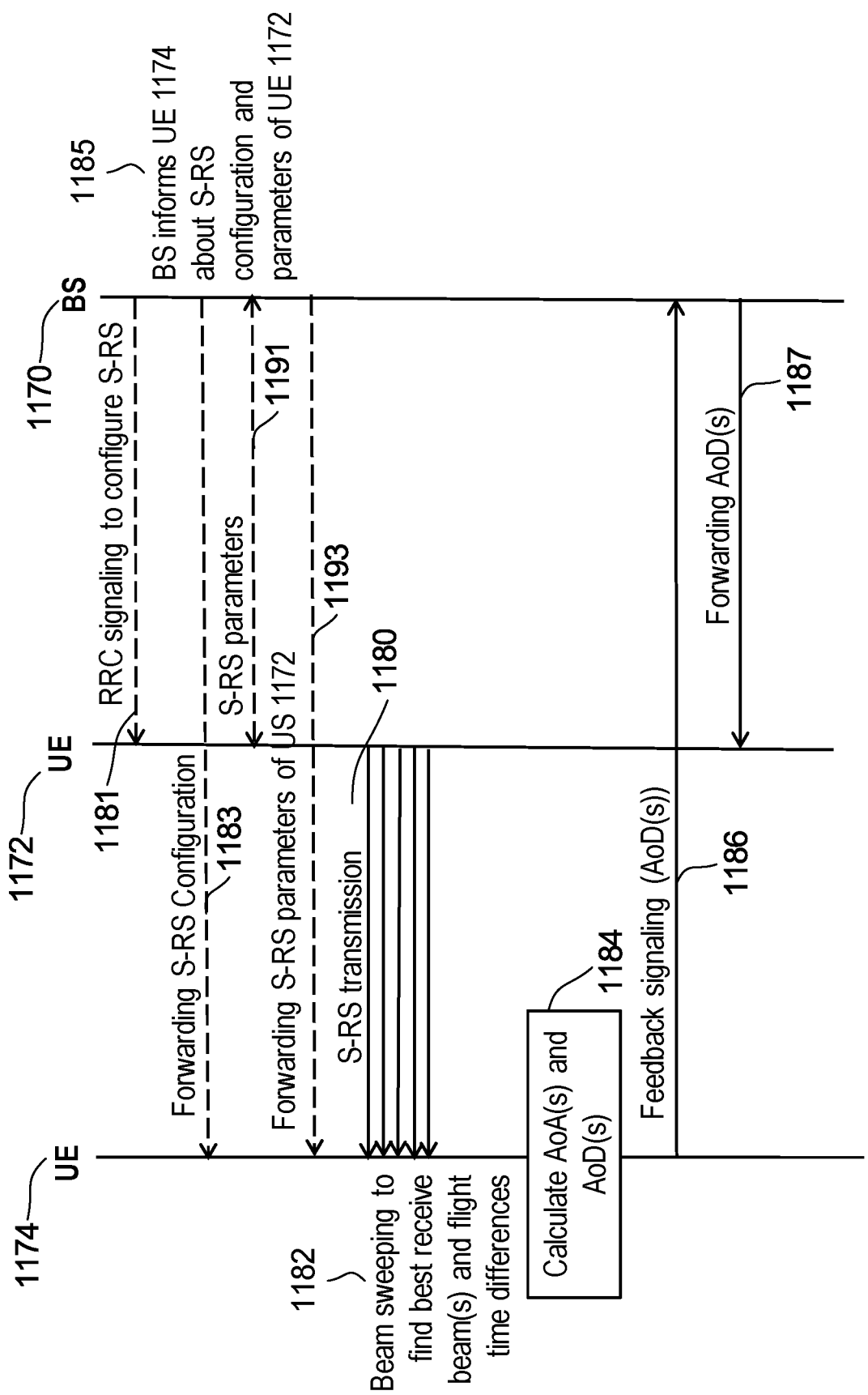
FIG. 11D is a signal flow diagram illustrating signaling in accordance with a further embodiment that involves SL-based measurement and estimation.

FIG. 11D is a signal flow diagram illustrating signaling in accordance with a further embodiment that involves SL-based measurement and estimation. The example shown in FIG. 11D is substantially the same as the example in FIG. 11C, but involves a different order of signaling, such as higher layer signaling, of S-RS configuration and parameters of a UE 1172 to a UE 1174 at 1185 in signaling 1183, 1193. Otherwise, the features shown at 1181, 1191, 1180, 1182, 1184, 1186, 1187 may be the same or substantially the same as similarly labelled features 1161, 1169, 1160, 1162, 1164, 1166, 1167, respectively, in FIG. 11C. The variations noted above for FIG. 11C, and others consistent with the present disclosure, also apply to FIG. 11D.

Figure 12:
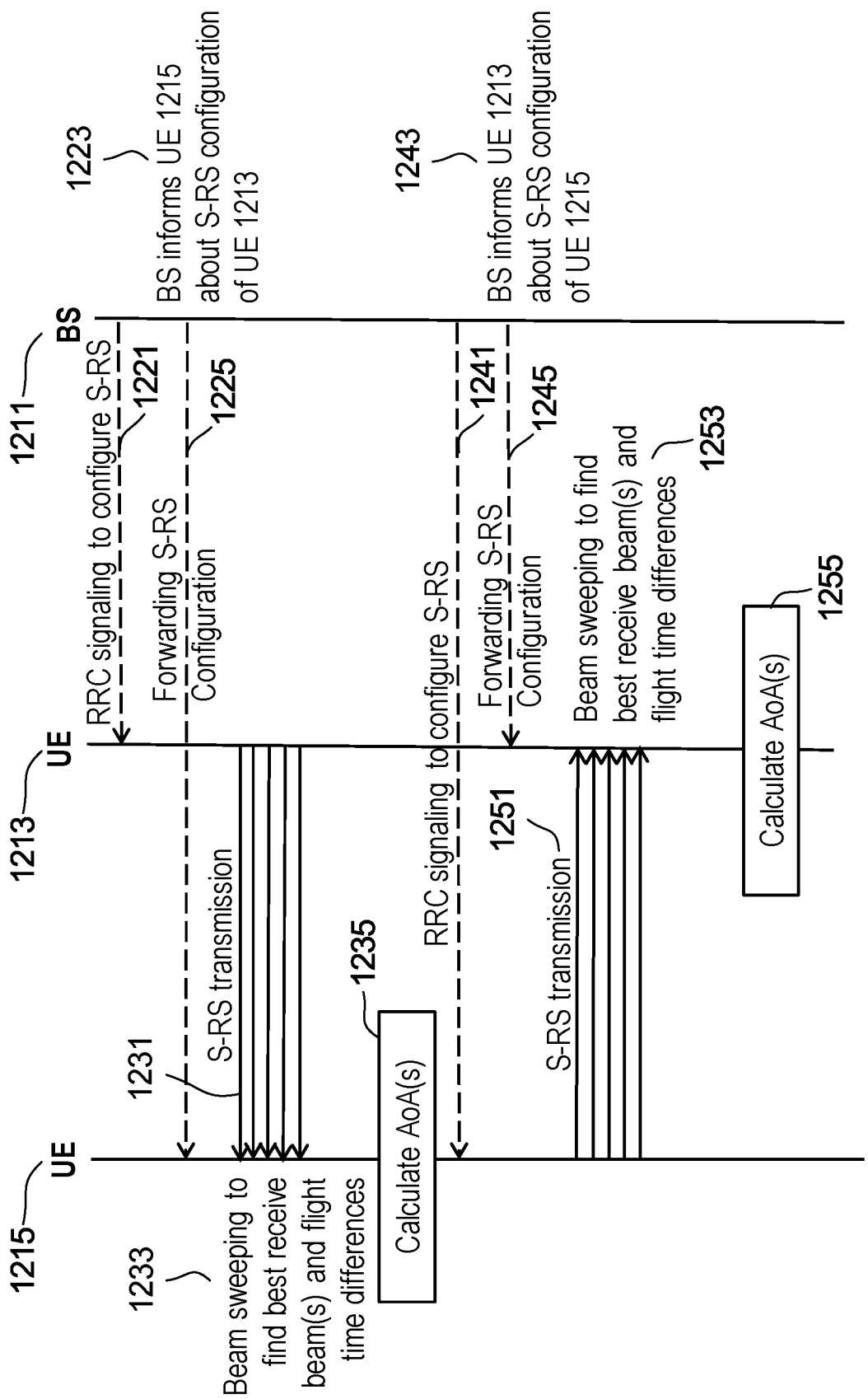
FIG. 12 is a signal flow diagram illustrating signaling in accordance with a further embodiment that involves SL-based measurement and estimation based on channel reciprocity.

Turning now to FIG. 12, the signal flow diagram in this drawing illustrates signaling in accordance with a further embodiment that involves SL-based measurement and estimation based on channel reciprocity. In FIG. 12, each of two UEs 1213 and 1215 is configured for S-RS signaling by a BS 1211 through RRC signaling 1221 and 1241, and the BS informs each UE of the S-RS configuration of the other UE. As shown, the BS 1211 informs the UE 1215 of the S-RS configuration of the UE 1213 at 1223 in signaling 1225, and the BS informs the UE 1213 of the S-RS configuration of the UE 1215 at 1243 in signaling 1245. Each UE 1215, 1213 performs beam sweeping as shown at 1233, 1253, respectively, and calculates AoA for one or more paths at 1235, 1255, respectively, based on S-RS signaling 1231, 1251, respectively, received from the other UE.

In a scenario in which channel reciprocity exists, which may be the case more often in D2D communications because of the relatively short distance and higher likelihood of a single LoS path between communication devices, the AoA(s) at each UE 1213, 1215 can be used as the AoD(s) from that same UE. Such use of one or more AoA(s) as the AoD(s) may be applied more generally to other embodiments in which channel reciprocity exists, and is not necessarily limited to D2D communications.

FIG. 13 is a flow diagram illustrating an example method according to an embodiment. The example method 1300, in one basic form, may involve receiving, at a first communication device in a wireless communication network, reference signaling from a second communication device in the wireless communication network over two or more beams with a same direction, as shown at 1306, and determining one or more values associated with a direction, as shown at 1308. Examples of reference signaling include the CSI-RS signaling and the S-RS signaling in FIGS. 9A to 12.

The one or more direction values are determined at 1308 based on the reference signaling received at 1306, and are associated with a direction at which the first communication device received the reference signaling from the second communication device. The direction may a direction that meets one or beam acquisition criteria for example. Illustrative examples of beam acquisition criteria are provided elsewhere herein.

The direction has a higher accuracy than a beam width associated with the received reference signaling. Although beam sweeping and refinement according to conventional techniques may determine direction within the accuracy of an antenna beam width that is used in beam sweeping, according to embodiments disclosed herein a direction is determined with a higher accuracy than such beam width. For example, in conventional Synchronisation Signal Block (SSB) beam sweeping procedures, network equipment sends SSBs and a UE sends information regarding SSB beams in Reference Signal Received Power (RSRP) feedback to the network. From this feedback, beam direction accuracy will be within the width of the SSB beam. However, according to embodiments herein, more accurate beam direction is determined. As an example, a direction determined according to embodiments herein may have an accuracy region or range of confidence of an estimated AoA and/or AoD that is narrower than the original beam that was used in beam sweeping.

The direction may be an arrival direction, also referred to herein as AoA, at which the first communication device received the reference signaling from the second communication device.

In some embodiments, the direction associated with the value(s) at 1308 is a departure direction of transmission of the reference signaling from which the first communication device received the reference signaling, also referred to herein as an AoD. Although AoA might be useful at a receiving communication device, AoD may be useful at a transmitting device from which reference signaling is received at 1306. In some embodiments, a method involves transmitting at 1310, from the first communication device, signaling that is indicative of the value(s) associated with the departure direction. Such signaling may be transmitted to the second communication device from which the reference signaling is received at 1304, or to another component, such as the BS in SL embodiments discussed above. Examples of such signaling are shown as feedback signaling in FIGS. 9A to 11D.

The signaling transmitted at 1310 in some embodiments is transmitted to the second communication device to enable the second communication device to calculate the departure direction. In other embodiments the signaling is transmitted to another component, such as the BS in SL embodiments discussed above, to enable that other component to calculate the departure direction. The value(s) may be or include, for example, one or more metrics associated with the departure direction, and examples of such metrics are provided elsewhere herein.

A communication device that receives reference signaling, referred to above as the first communication device, may itself calculate the departure direction. In that case, the value(s) associated with the departure direction may specify the departure direction. In some examples, the value(s) may be determined based on one or more of: separation, using beam sweeping and temporal resolution, of paths over which the reference signaling is received in the two or more beams with the same direction; phase difference between measurements of the reference signaling that is received in the two or more beams with the same direction; measurements from the reference signaling received at different times by a single radio frequency (RF) chain; and beam squint.

The first communication device may receive additional signaling to enable the first communication device to calculate the departure direction. This additional signaling may be received from the second communication device or from another component, such as the BS in SL examples described above.

Such additional signaling is shown by way of example at 1304, and may be or include signaling that is indicative of one or more parameters to be used by the second communication device in transmitting the reference signaling. This additional signaling may also or instead include signaling that is indicative of any one or more of: beam pattern, the beam width, antenna configuration, or antenna structure.

In general, such additional signaling may be received by a component to enable that component to calculate the departure direction. Examples of such signaling include signaling indicative of CSI-RS parameters as shown at 963 in FIG. 9B, and signaling indicative of S-RS parameters as shown at 1020 in FIG. 10B, at 1149 in FIG. 11B, at 1169 and 1163 in FIG. 11C, and at 1191 and 1193 in FIG. 11D.

In some embodiments, as shown at 1302 signaling to configure the first communication device for the reference signaling may be received at the first communication device. This may include, for example, RRC signaling received from network equipment such as a BS, and/or signaling to inform the first communication device about reference signaling configuration of the second communication device, as in SL examples described above. Examples of RRC signaling and forwarding of configurations are shown in FIGS. 9A to 12.

Methods that are consistent with FIG. 13, and/or are consistent with other teachings herein, may be implemented in any of various scenarios. For example, the first communication device may be a UE and the second communication device may be network equipment in a wireless communication network, as in DL examples that are provided elsewhere herein. The first communication device may be network equipment in a wireless communication network and the second communication device may be a UE, as in UL examples that are provided elsewhere herein. The first communication device may be a first UE and the second communication device may be a second UE, as in SL examples that are provided elsewhere herein.

Other features may also or instead be implemented in method embodiments. For example, the determining at 1308 may involve determining the value(s) based on any one or more of the following, which are disclosed in detail at least above: separation, using beam sweeping and temporal resolution, of paths over which the reference signaling is received; phase difference between paths over which the reference signaling is received in the two or more beams with the same direction; phase difference between measurements of the reference signaling that is received in the two or more beams with the same direction measurements from the reference signaling received at different times by a single RF chain; and beam squint.

The method features described above with reference to FIG. 13, and/or other features disclosed herein, may also or instead be implemented in the form of a processor-readable memory storing processor-executable instructions which, when executed by one or more processors at a first communication device in a wireless communication network, cause the processor(s) to perform a method. As an example, a method may include receiving, at the first communication device, reference signaling in two or more beams with a same direction from a second communication device in the wireless communication network; and determining, based on the received reference signaling, one or more values associated with a direction at which the first communication device received the reference signaling from the second communication device. The direction has a higher accuracy than a beam width associated with the received reference signaling.

Other features disclosed herein may be implemented in such a processor-readable memory embodiment. For example, any one or more of the features described above with reference to FIG. 13 and/or others disclosed herein may be provided, in any of various combinations, in some embodiments.

FIG. 14 is a flow diagram illustrating an example method according to an embodiment. The example method 1300 in FIG. 13 is illustrative of operations that may be performed in some embodiments at a receiving device or a receive side during beam acquisition, and the example method 1400 in FIG. 14 is illustrative of operations that may be performed in some embodiments at a transmitting device or a transmit side, or elsewhere, during beam acquisition.

One basic form of such a method may involve transmitting reference signaling at 1406 to a first communication device from a second communication device in a wireless communication network in two or more beams with a same direction, and receiving at the second communication device signaling indicative of one or more direction values, as shown at 1408. The one or more direction values are determined at the first communication device and are associated with a direction of transmission of the reference signaling from the second communication device, also referred to herein as an AoD, from which the first communication device received the reference signaling. The direction associated with the value(s) has a higher accuracy than a beam width associated with the reference signaling. As described elsewhere herein, the direction may be a direction from which the first communication device best received the reference signaling or a direction that otherwise meets or satisfies one or more beam acquisition criteria.

The signaling at 1408 may be received from the first communication device, or from another component such as the BS in SL examples discussed above.

Some embodiments may involve transmitting, to the first communication device, signaling to configure the first communication device for the reference signaling. This is shown at 1402. Such signaling may include, for example, RRC signaling to configure the first communication device, and/or other signaling to inform the first communication device about reference signaling configuration of the second communication device. The signaling referenced at 1402 may be transmitted to the first communication device from the second communication device and/or from another component such as the BS in SL examples discussed above.

The direction value(s) at 1408 may enable the direction of transmission of the reference signaling to be calculated at 1410, by the second communication device or another component such as the BS in SL embodiments discussed above. In other embodiments, a communication device that receives reference signaling, referred to above as the first communication device, may calculate the direction of transmission, in which case the direction value(s) referenced at 1408 may specify the direction. Additional signaling may be transmitted to the first communication device at 1404 to enable the first communication device to calculate the direction. This additional signaling may be transmitted by the second communication device or another component, such as the BS in SL examples described above.

Such additional signaling may be or include signaling that is indicative of one or more parameters to be used by the second communication device in transmitting the reference signaling at 1406. Signaling to enable the first communication device to calculate the departure direction may also or instead include signaling that is indicative of any one or more of such parameters as beam pattern, the beam width, antenna configuration, or antenna structure. Other examples of such additional signaling are provided elsewhere herein.

Methods that are consistent with FIG. 14, and/or are consistent with other teachings herein, may be implemented in any of various scenarios, including at least the following examples provided above with reference to FIG. 13, in which: the first communication device is a UE and the second communication device is network equipment; the first communication device is network equipment and the second communication device is a UE; or the first communication device is a first UE and the second communication device is a second UE.

In embodiments that involve determining a value associated with a direction, the determining at 1408 may involve determine the value based on any one or more of the following, as described in detail at least above: separation, using beam sweeping and temporal resolution, of paths over which the reference signaling is received in the two or more beams with the same direction; phase difference between measurements of the reference signaling that is received in the two or more beams with the same direction; measurements from the reference signaling received at different times by a single RF chain; and beam squint.

These and other features may also or instead be implemented in the form of a processor-readable memory storing processor-executable instructions which, when executed by one or more processors at a second communication device in a wireless communication network, cause the processor(s) to perform a method. As an example, a method may include transmitting, to a first communication device from the second communication device, reference signaling in two or more beams with a same direction; and receiving, at the second communication device, signaling indicative of one or more values determined at the first communication device and associated with a direction of transmission of the reference signaling from which the first communication device received the reference signaling. As noted herein for other embodiments, the direction has a higher accuracy than a beam width associated with the reference signaling.

Other features disclosed herein may be implemented in such a processor-readable memory embodiment. For example, any one or more of the features described above with reference to FIG. 14 and/or others disclosed herein may be provided, in any of various combinations, in some embodiments.

Figure 15:
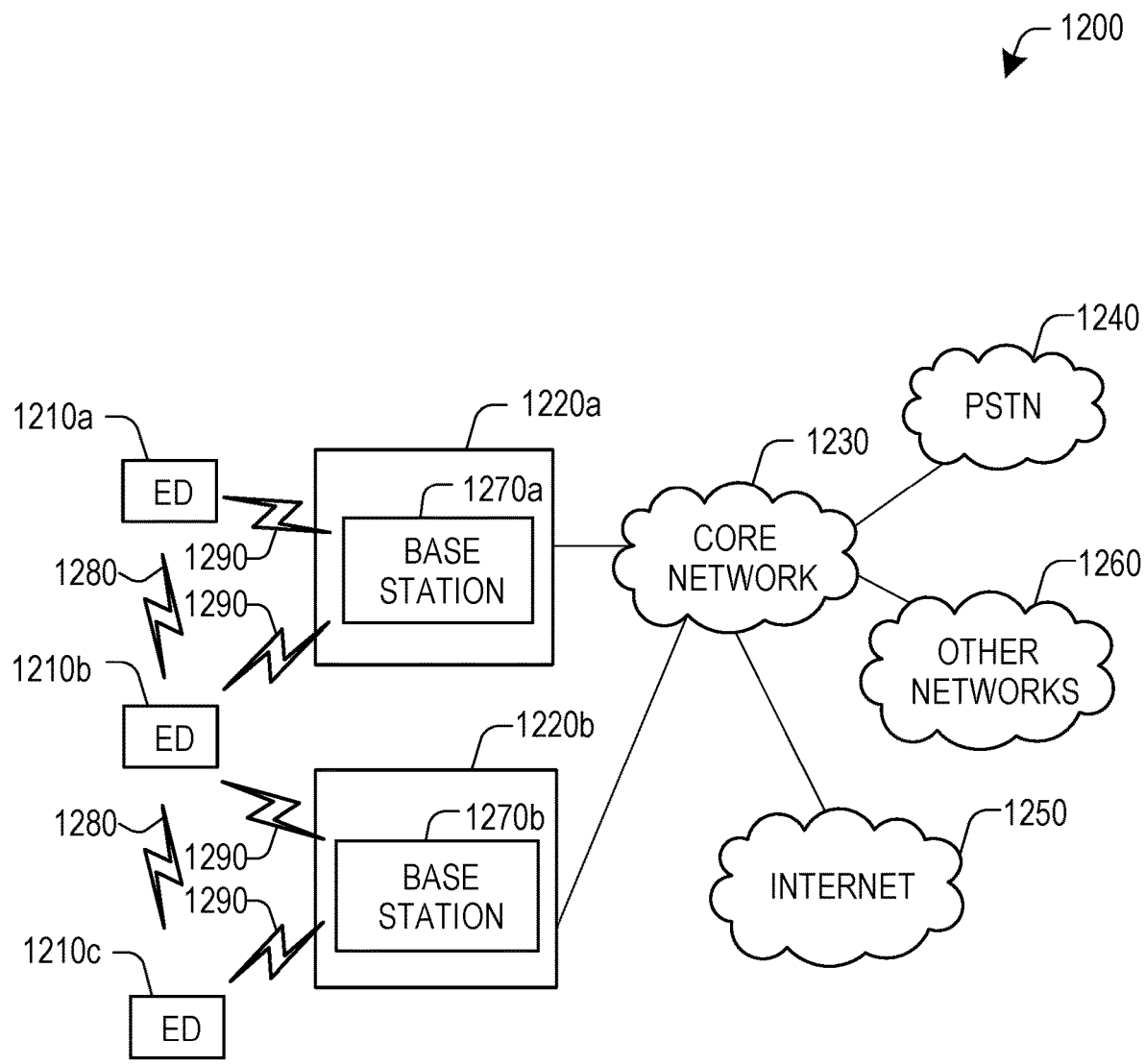
FIG. 15 illustrates an example communication system in which embodiments of the present disclosure could be implemented.

Various embodiments are disclosed by way of example above. FIG. 15 illustrates an example communication system 1200 in which embodiments of the present disclosure could be implemented. In general, the communication system 1200 enables multiple wireless or wired elements to communicate data and other content. The purpose of the communication system 1200 may be to provide content (voice, data, video, text) via broadcast, unicast, multimedia broadcast multicast service (MBMS), or user device to user device, etc. The communication system 1200 may operate by sharing resources such as bandwidth.

In this example, the communication system 1200 includes electronic devices (ED) 1210a-1210c, radio access networks (RANs) 1220a-1220b, a core network 1230, a public switched telephone network (PSTN) 1240, the internet 1250, and other networks 1260. Although certain numbers of these components or elements are shown in FIG. 15, any reasonable number of these components or elements may be included in the communication system 1200.

The EDs 1210a-1210c are configured to operate, communicate, or both, in the communication system 1200. For example, the EDs 1210a-1210c are configured to transmit, receive, or both via wireless or wired communication channels. Each ED 1210a-1210c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 15, the RANs 1220a-1220b include base stations 1270a-1270b, respectively. Each base station 1270a-1270b is configured to wirelessly interface with one or more of the EDs 1210a-1210c to enable access to any other base station 1270a-1270b, the core network 1230, the PSTN 1240, the internet 1250, and/or the other networks 1260. For example, the base stations 1270a-1270b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), a wireless router, or a network access node in 6G or later. Any ED 1210a-1210c may be alternatively or additionally configured to interface, access, or communicate with any other base station 1270a-1270b, the internet 1250, the core network 1230, the PSTN 1240, the other networks 1260, or any combination thereof. The communication system 1200 may include RANs wherein the corresponding base station accesses the core network 1230 via the internet 1250. In some embodiments the EDs 1210a-1210c include EDs that are able to communicate directly with each other through direct wireless links 1280, which are also often referred to as sidelinks. In some embodiments, the base stations 1270a-1270b could be at least one of a terrestrial base station or a non-terrestrial base station (e.g., a flying base station).

The EDs 1210a-1210c and base stations 1270a-1270b are examples of communication equipment that can be configured to implement some or all of the functionality and/or embodiments described herein. In the embodiment shown in FIG. 15, the base station 1270a forms part of the RAN 1220a, which may include other base stations, base station controller(s) (BSC), radio network controller(s) (RNC), relay nodes, elements, and/or devices. Any base station 1270a, 1270b may be a single element, as shown, or multiple elements, distributed in the corresponding RAN, or otherwise. Also, the base station 1270b forms part of the RAN 1220b, which may include other base stations, elements, and/or devices. Each base station 1270a-1270b transmits and/or receives wireless signals within a particular geographic region or area, sometimes referred to as a "cell" or "coverage area". A cell may be further divided into cell sectors, and a base station 1270a-1270b may, for example, employ multiple transceivers to provide service to multiple sectors. In some embodiments there may be established pico or femto cells where the radio access technology supports such cells. In some embodiments, multiple transceivers could be used for each cell, for example using MIMO technology. The number of RANs 1220a-1220b shown is an example only. Any number of RANs may be contemplated when devising the communication system 1200.

Alternatively, more than one base station may form one cell, where the multiple base stations in the cell may share a same cell identifier (ID). A cell comprising the multiple base stations may be referred to as a hyper cell. The hyper cell may only comprise at least one terrestrial base station or only comprise at least one non-terrestrial base station. The hyper cell may also comprise at least one terrestrial base station and at least one non-terrestrial base station. A cell or a hyper cell may comprise base stations of a same type, or base stations of different types. For example, a cell or a hyper cell for an area covered by a beam spot or multiple beam spots which are generated by satellite base station(s) can further include one or more other type of terrestrial base stations or non-terrestrial base stations. From the perspective of a UE, the hyper cell could be an area covered by a virtual access entity. The hyper cell may include multiple base stations having the same cell ID. The hyper cell may be adapted according to network topology, load distribution, or UE distribution. The hyper cell topology may be dynamically updated to adapt to changes in network topology, load distribution, and/or UE distribution.

The base stations 1270a-1270b communicate with one or more of the EDs 1210a-1210c over one or more air interfaces 1280 using wireless communication links e.g. radio frequency (RF), microwave, infrared (IR), etc. The air interfaces 1290 may utilize any suitable radio access technology. For example, the communication system 1200 may implement one or more channel access methods, such as code division multiple access (CDMA), time division multiple access (TDMA), frequency division multiple access (FDMA), orthogonal frequency division multiple access (OFDMA), or single-carrier FDMA (SC-FDMA) in the air interfaces 1290.

A base station 1270a-1270b may implement Universal Mobile Telecommunication System (UMTS) Terrestrial Radio Access (UTRA) to establish an air interface 1290 using wideband CDMA (WCDMA). In doing so, the base station 1270a-1270b may implement protocols such as HSPA, HSPA+ optionally including HSDPA, HSUPA or both. Alternatively, a base station 1270a-1270b may establish an air interface 1290 with Evolved UTMS Terrestrial Radio Access (E-UTRA) using LTE, LTE-A, and/or LTE-B. It is contemplated that the communication system 1200 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 1220a-1220b are in communication with the core network 1230 to provide the EDs 1210a-1210c with various services such as voice, data, and other services. The RANs 1220a-1220b and/or the core network 1230 may be in direct or indirect communication with one or more other RANs (not shown), which may or may not be directly served by core network 1230, and may or may not employ the same radio access technology as RAN 1220a, RAN 1220b or both. The core network 1230 may also serve as a gateway access between (i) the RANs 1220a-1220b or EDs 1210a-1210c or both, and (ii) other networks (such as the PSTN 1240, the internet 1250, and the other networks 1260). In addition, some or all of the EDs 1210a-1210c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 1250. PSTN 1240 may include circuit switched telephone networks for providing plain old telephone service (POTS). Internet 1250 may include a network of computers and subnets (intranets) or both, and incorporate protocols, such as IP, TCP, UDP. EDs 1210a-1210c may be multimode devices capable of operation according to multiple radio access technologies, and incorporate multiple transceivers necessary to support such radio access technologies.

Figure 16A:
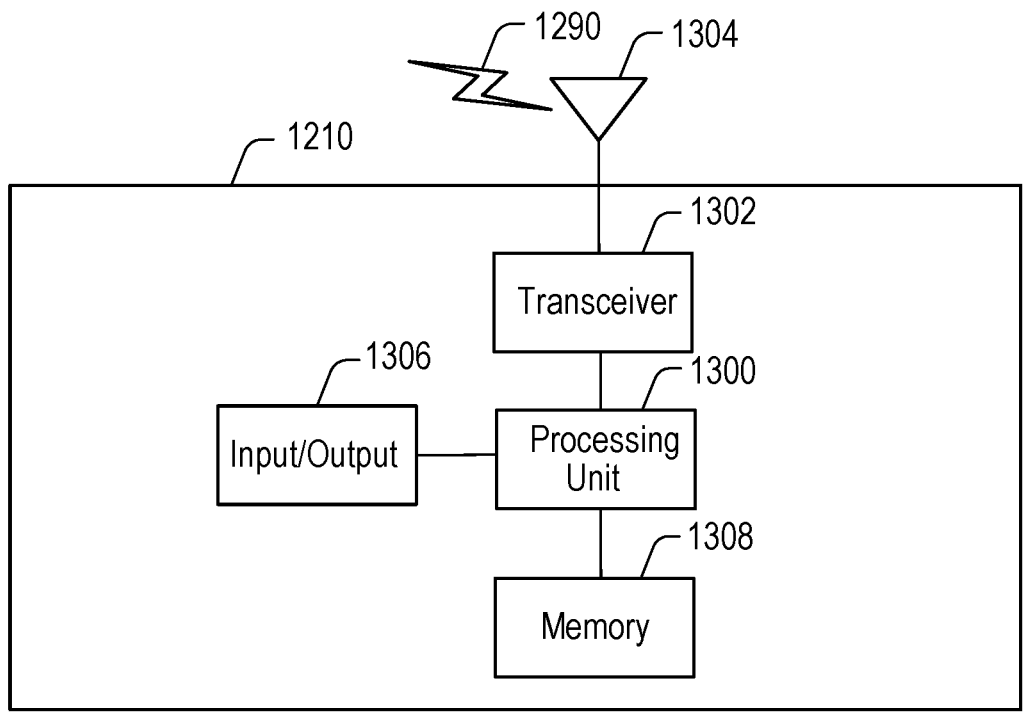
FIG. 16A is a block diagram of an example electronic device.
Figure 16B:
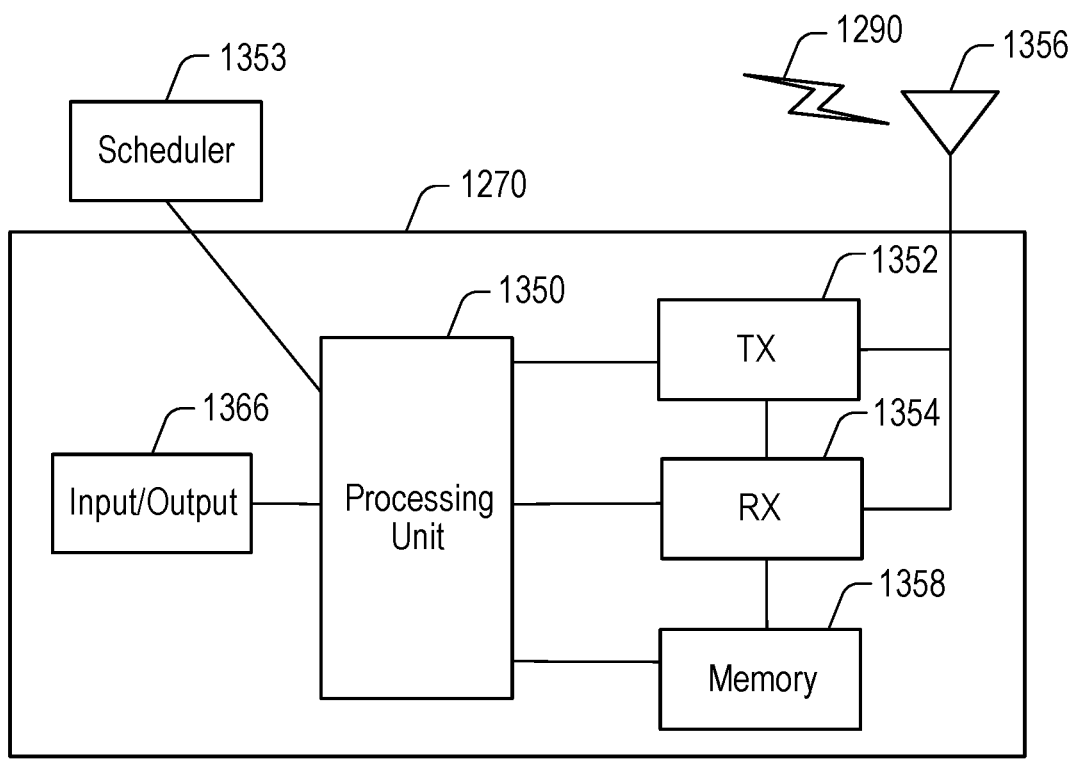
FIG. 16B is a block diagram of an example base station.

FIGS. 16A and 16B illustrate example devices that may implement the methods and teachings according to this disclosure. In particular, FIG. 16A illustrates an example ED 1210, and FIG. 16B illustrates an example base station 1270. These components could be used in the communication system 1200 or in any other suitable system.

As shown in FIG. 16A, the ED 1210 includes at least one processing unit 1300. The processing unit 1300 implements various processing operations of the ED 1210. For example, the processing unit 1300 could perform signal coding, data processing, power control, input/output processing, digital beamforming, or any other functionality enabling the ED 1210 to operate in the communication system 1200. The processing unit 1300 may also be configured to implement some or all of the functionality and/or embodiments described in more detail elsewhere herein. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1210 also includes at least one transceiver 1302. The transceiver 1302 is configured to modulate data or other content for transmission by at least one antenna or Network Interface Controller (NIC) 1304. The transceiver 1302 is also configured to demodulate data or other content received by the at least one antenna 1304. Each transceiver 1302 includes any suitable structure for generating signals for wireless or wired transmission and/or processing signals received wirelessly or by wire. Structure for generating signals for wireless transmission and/or processing signals received wirelessly is referred to herein as an RF chain. One or more than one RF chains may be provided. One or more analog beamformers may also be implemented in the transceiver 1302. Each antenna 1304 includes any suitable structure for transmitting and/or receiving wireless or wired signals. 1D antenna structures such as ULAs and 2D antenna structures such as panels, as disclosed herein by way of example, may be provided. More generally, one or multiple transceivers 1302 could be used in the ED 1210. One or multiple antennas 1304 could be used in the ED 1210. Although shown as a single functional unit, a transceiver 1302 could also be implemented using at least one transmitter and at least one separate receiver.

The ED 1210 further includes one or more input/output devices 1306 or interfaces (such as a wired interface to the internet 1250 in FIG. 15). The input/output devices 1306 permit interaction with a user or other devices in the network. Each input/output device 1306 includes any suitable structure for providing information to or receiving information from a user, such as a speaker, microphone, keypad, keyboard, display, or touch screen, including network interface communications.

In addition, the ED 1210 includes at least one memory 1308. The memory 1308 stores instructions and data used, generated, or collected by the ED 1210. For example, the memory 1308 could store software instructions or modules configured to implement some or all of the functionality and/or embodiments described herein and that are executed by the processing unit(s) 1300. Each memory 1308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16B, the base station 1270 includes at least one processing unit 1350, at least one transmitter 1352, at least one receiver 1354, one or more antennas 1356, at least one memory 1358, and one or more input/output devices or interfaces 1366. A transceiver, not shown, may be used instead of the transmitter 1352 and receiver 1354. A scheduler 1353 may be coupled to the processing unit 1350. The scheduler 1353 may be included within or operated separately from the base station 1270. The processing unit 1350 implements various processing operations of the base station 1270, such as signal coding, data processing, power control, input/output processing, digital beamforming, or any other functionality. The processing unit 1350 can also be configured to implement some or all of the functionality and/or embodiments described in more detail herein. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transmitter 1352 includes any suitable structure for generating signals for wireless or wired transmission, to one or more EDs or other devices. Each receiver 1354 includes any suitable structure for processing signals received wirelessly or by wire, from one or more EDs or other devices. As noted above, structure for generating signals for wireless transmission and/or processing signals received wirelessly is referred to herein as an RF chain. One or more analog beamformers may also be implemented in the transmitter 1352 and/or the receiver 1354. Although shown as separate components, at least one transmitter 1352 and at least one receiver 1354 could be combined into a transceiver. Each antenna 1356 includes any suitable structure for transmitting and/or receiving wireless or wired signals. 1D antenna structures such as ULAs and 2D antenna structures such as panels, as disclosed herein by way of example, may be provided. Although a common antenna 1356 is shown as being coupled to both the transmitter 1352 and the receiver 1354, one or more antennas 1356 could be coupled to the transmitter(s) 1352, and one or more separate antennas 1356 could be coupled to the receiver(s) 1354. Each memory 1358 includes any suitable volatile and/or non-volatile storage and retrieval device(s) such as those described above in connection to the ED 1210 in FIG. 16A. The memory 1358 stores instructions and data used, generated, or collected by the base station 1270. For example, the memory 1358 could store software instructions or modules configured to implement some or all of the functionality and/or embodiments described herein and that are executed by the processing unit(s) 1350.

Each input/output device 1366 permits interaction with a user or other devices in the network. Each input/output device 1366 includes any suitable structure for providing information to or receiving/providing information from a user, including network interface communications.

Figure 17:
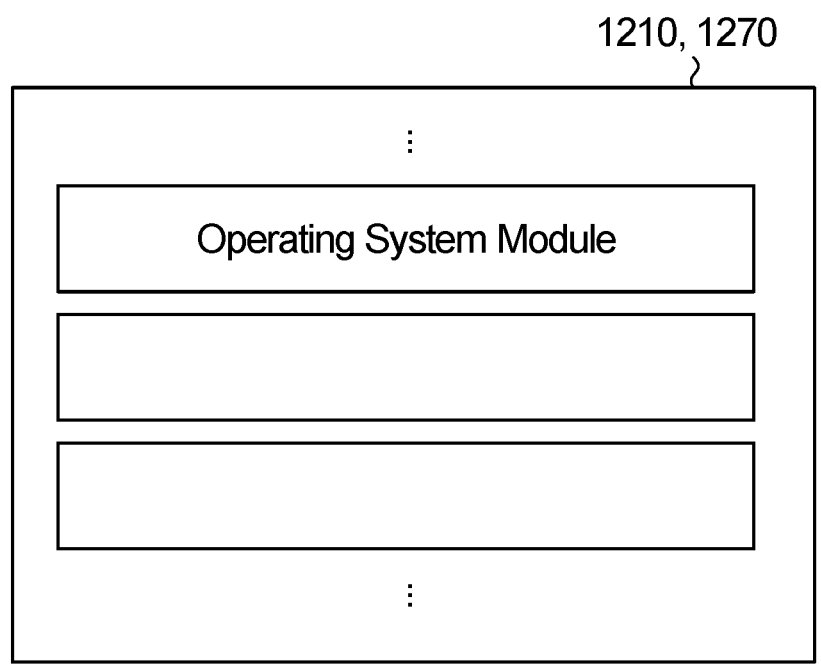
FIG. 17 is a block diagram of component modules.

It should be appreciated that one or more steps of the embodiment methods provided herein may be performed by corresponding units or modules. FIG. 17 shows this generally as an embodiment that includes an operating system module, but other embodiments are possible. For example, a signal may be transmitted by a transmitting unit or a transmitting module. A signal may be received by a receiving unit or a receiving module. A signal may be processed by a processing unit or a processing module. Other steps may be performed by an ML module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

In general, apparatus embodiments implementing methods as disclosed herein could take any of various forms. For example, in an embodiment a communication device such as a UE or network equipment for a communication network may include a receiver, a transmitter, a processor coupled to the receiver and to the transmitter, and a processor-readable memory coupled to the processor. The processor-readable memory stores processor-executable instructions which, when executed by the processor, cause the processor to perform a method. Illustrative embodiments of methods are disclosed herein, and instructions stored on a processor-readable memory may, when executed, cause a processor to execute any of such methods.

In one particular example embodiment, a first communication device for a wireless communication network includes a receiver, as shown at 1302, 1354 for example, to receive reference signaling, over two or more beams with a same direction, from a second communication device in the wireless communication network, and a processor, as shown at 1300, 1350 for example, coupled to the receiver. The processor is configured, by executing software stored in a memory such as 1308, 1358 for example, to determine based on the received reference signaling over the two or more beams with the same direction, one or more values associated with a direction. The direction is a direction at which the first communication device received the reference signaling from the second communication device, and has a higher accuracy than a beam width associated with the received reference signaling.

Features and examples that are described elsewhere herein, such as those described with reference to methods, are also applicable to such an embodiment. For example, embodiments may include any one or more of the following features, in any of various combinations:

the direction is an arrival direction at which the first communication device received the reference signaling from the second communication device;

the direction is a departure direction of transmission of the reference signaling from which the first communication device received the reference signaling;

the first communication device further includes a transmitter, at 1302, 1352 for example, coupled to the processor, to transmit signaling indicative of the value(s) associated with the departure direction;

the receiver is further configured to receive signaling to configure the first communication device for the reference signaling;

the transmitter is configured to transmit, to the second communication device or another component, the signaling indicative of the value(s) associated with the departure direction to enable the second communication device or the other component to calculate the departure direction;

the value(s) associated with the departure direction may specify the departure direction;

the receiver is further configured to receive further signaling, and the processor is configured to determine the departure direction based on the reference signaling from the second communication device and the received further signaling;

the further signaling is or includes signaling indicative of parameters to be used by the second communication device in transmitting the reference signaling;

the further signaling is or includes signaling indicative of any one or more of: beam pattern, the beam width, antenna configuration, or antenna structure;

the first communication device is a UE and the second communication device is network equipment in the wireless communication network;

the first communication device is network equipment in the wireless communication network and the second communication device is a UE;

the first communication device is a first UE and the second communication device is a second UE;

the processor is configured to determine the value based on one or more of: separation, using beam sweeping and temporal resolution, of paths over which the reference signaling is received over the two or more beams with the same direction; phase difference between measurements of the reference signaling that is received in the two or more beams with the same direction; measurements from the reference signaling received at different times by a single radio frequency (RF) chain; and beam squint.

According to other embodiments, in a method a second communication device transmits reference signaling to a first communication device over two or more beams with a same direction in a wireless communication network, and receives signaling indicative of a value determined at the first communication device and associated with a direction of transmission of the reference signaling from which the first communication device received the reference signaling, the direction having a higher accuracy than a beam width associated with the reference signaling. A communication device for a wireless communication network includes a transmitter, as shown at 1302, 1352 for example, to transmit reference signaling, over two or more beams with a same direction, to a first communication device in the wireless communication network; and a receiver, at 1302, 1354 for example, to receive signaling indicative of one or more values determined at the first communication device and associated with a direction of transmission of the reference signaling from which the first communication device received the reference signaling. The direction has a higher accuracy than a beam width associated with the reference signaling.

Features and examples that are described elsewhere herein, such as those described with reference to methods, are also applicable to such an embodiment. For example, embodiments may include any one or more of the following features, in any of various combinations:

the transmitter is further configured to transmit signaling to the first communication device to configure the first communication device for the reference signaling;

the value(s) associated with the direction of transmission may enable the communication device to calculate the direction of transmission;

the value(s) associated with the direction of transmission may specify the direction of transmission;

the transmitter is further configured to transmit further signaling to the first communication device to enable the first communication device to calculate the direction of transmission;

the further signaling is or includes signaling indicative of one or more parameters to be used by the communication device in transmitting the reference signaling;

the further signaling is or includes signaling indicative of one or more of: beam pattern, the beam width, antenna configuration, or antenna structure;

the communication device is network equipment in the wireless communication network and the first communication device is a UE;

the communication device is a UE and the first communication device is network equipment in the wireless communication network;

the communication device is a first UE and the first communication device is a second UE;

the value is determined based on one or more of: separation, using beam sweeping and temporal resolution, of paths over which the reference signaling is received in the two or more beams with the same direction by the first communication device; phase difference between measurements of the reference signaling that is received in the two or more beams with the same direction; measurements from the reference signaling received at different times by a single RF chain at the first communication device; and beam squint determined at the first communication device.

In general, the present disclosure contemplates embodiments that utilize techniques such as temporal separation of a channel as well as beam sweeping in order to get an ultra-sparse representation of the channel with a sparsity order of up to one nonzero element. Some embodiments utilize phase difference and/or timing difference of signals that are received by multiple antenna arrays to estimate the channel. Signaling, to report the AoD-related metrics or values for example, is also considered. Single RF chain and multiple RF chain applications are possible.

Disclosed embodiments also encompass use of phase and correlation difference, which indicates time difference, to estimate the channel in the THz region where the channel is shown by a sparse model separated in time and direction. Some of these techniques can be utilized in some mmWave deployments, such as where the channel includes a few paths in different directions. Moreover, correlation values are not necessarily the indicator of time difference. Other mechanisms such as direct estimation of the timing in each antenna sub-array can be used for the same purpose.

Although some embodiments of beam acquisition as disclosed herein may start with beam sweeping and beam refinement, applying the techniques disclosed herein may reduce the number of beam refinement cycles compared to existing procedures such as Synchronisation Signal Block (SSB) and Random Access Channel (RACH) procedures.

Currently, beam refinement procedures tend to be closed loop. Finer CSI-RS beams are set up based on wider CSI-RS or SSB beam Reference Signal Received Power (RSRP) feedback, which introduces more feedback overhead and delay. Embodiments disclosed herein include embodiments that can be open loop, or with fewer closed loop steps. The beam squint and phase difference measurements are based on wider beam RSRP measurement, and a feedback metric, such as phase difference or power ratio, can be a scalar value per identified or reported path, which in many cases will include one LoS path or the strongest beam.

Numerous modifications and variations of the present disclosure are possible in light of the above teachings. It is therefore to be understood that within the scope of the appended claims, the disclosure may be practiced otherwise than as specifically described herein.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

As an example, an embodiment based on beam squint may be combined with an embodiment that involves estimation based on phase difference, to initially narrow the estimation of AoA/AoD and thereby alleviate ambiguity that may affect estimation based on phase difference and arrive at very accurate direction estimation and beam acquisition.

Embodiments may be combined with other features as well, such as positioning techniques to narrow down the AoA/AoD range and potentially provide better beam tracking and/or less ambiguity associated with phase difference AoA/AoD estimation.

Although this disclosure refers to illustrative embodiments, the disclosure is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although the present disclosure has been described with reference to specific features and embodiments thereof, various modifications and combinations can be made thereto without departing from the disclosure. The description and drawings are, accordingly, to be regarded simply as an illustration of some embodiments of the disclosure as defined by the appended claims, and are contemplated to cover any and all modifications, variations, combinations or equivalents that fall within the scope of the present disclosure. Therefore, although the present disclosure and its advantages have been described in detail, various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

In addition, although described primarily in the context of methods and apparatus, other implementations are also contemplated, as processor-executable or computer-executable instructions stored on a non-transitory processor-readable or computer-readable medium, for example. Such media could store programming or instructions to perform any of various methods consistent with the present disclosure.

The invention claimed is:

1. A method comprising:
receiving, at a first communication device in a wireless communication network, reference signaling in two or more beams with a same direction from a second communication device in the wireless communication network;
determining, based on the received reference signaling, a value associated with a direction at which the first communication device received the reference signaling from the second communication device, the direction having a higher accuracy than a beam width associated with the received reference signaling.

2. The method of claim 1, wherein the direction comprises an arrival direction at which the first communication device received the reference signaling from the second communication device.

3. The method of claim 1, wherein the direction comprises a departure direction of transmission of the reference signaling from which the first communication device received the reference signaling, the method further comprising:
transmitting, from the first communication device, signaling indicative of the value associated with the departure direction.

4. The method of claim 3, wherein the signaling indicative of the value associated with the departure direction is transmitted to the second communication device to enable the second communication device to calculate the departure direction.

5. The method of claim 3, wherein the value associated with the departure direction specifies the departure direction.

6. The method of claim 5, further comprising:
receiving further signaling at the first communication device,
wherein the determining comprises calculating the departure direction based on the reference signaling from the second communication device and the received further signaling.

7. The method of claim 6, wherein the further signaling comprises signaling indicative of one or more of: beam pattern, the beam width, antenna configuration, and antenna structure.

8. The method of claim 1, wherein:
the first communication device comprises a User Equipment (UE) and the second communication device comprises network equipment in the wireless communication network;
the first communication device comprises network equipment in the wireless communication network and the second communication device comprises a UE; or the first communication device comprises a first UE and the second communication device comprises a second UE.

9. The method of claim 1, wherein the determining comprises determining the value based on one or more of: separation, using beam sweeping and temporal resolution, of paths over which the reference signaling is received in the two or more beams with the same direction; phase difference between measurements of the reference signaling that is received in the two or more beams with the same direction; measurements from the reference signaling received at different times by a single radio frequency (RF) chain; and beam squint.

10. A non-transitory processor-readable medium storing instructions which, when executed by one or more processors at a first communication device in a wireless communication network, cause the one or more processors to perform a method comprising:
receiving, at the first communication device, reference signaling in two or more beams with a same direction from a second communication device in the wireless communication network;
determining, based on the received reference signaling, a value associated with a direction at which the first communication device received the reference signaling from the second communication device, the direction having a higher accuracy than a beam width associated with the received reference signaling.

11. A first communication device for a wireless communication network, the first communication device comprising:
a receiver to receive reference signaling in two or more beams with a same direction from a second communication device in the wireless communication network;
a processor, coupled to the receiver, to determine based on the received reference signaling, a value associated with a direction at which the first communication device received the reference signaling from the second communication device, the direction having a higher accuracy than a beam width associated with the received reference signaling.

12. The first communication device of claim 11, wherein the direction comprises an arrival direction at which the first communication device received the reference signaling from the second communication device.

13. The first communication device of claim 11, wherein the direction comprises a departure direction of transmission of the reference signaling from which the first communication device received the reference signaling, the first communication device further comprising:
a transmitter, coupled to the processor, to transmit signaling indicative of the value associated with the departure direction.

14. The first communication device of claim 13, wherein the transmitter is configured to transmit, to the second communication device, the signaling indicative of the value associated with the departure direction to enable the second communication device to calculate the departure direction.

15. The first communication device of claim 13, wherein the value associated with the departure direction specifies the departure direction.

16. The first communication device of claim 15, wherein the receiver is further configured to receive further signaling, and wherein the processor is configured to determine the departure direction based on the reference signaling from the second communication device and the received further signaling.

17. The first communication device of claim 16, wherein the further signaling comprises signaling indicative of parameters to be used by the second communication device in transmitting the reference signaling.

18. The first communication device of claim 16, wherein the further signaling comprises signaling indicative of one or more of: beam pattern, the beam width, antenna configuration, or antenna structure.

19. The first communication device of claim 11, wherein:
the first communication device comprises a User Equipment (UE) and the second communication device comprises network equipment in the wireless communication network;
the first communication device comprises network equipment in the wireless communication network and the second communication device comprises a UE; or
the first communication device comprises a first UE and the second communication device comprises a second UE.

20. The first communication device of claim 11, wherein the processor is configured to determine the value based on one or more of: separation, using beam sweeping and temporal resolution, of paths over which the reference signaling is received in the two or more beams with the same direction; phase difference measurements of the reference signaling that is received in the two or more beams with the same direction; measurements from the reference signaling received at different times by a single radio frequency (RF) chain; and beam squint.

* * * * *